(12) United States Patent
Haber

(10) Patent No.: US 7,637,556 B2
(45) Date of Patent: Dec. 29, 2009

(54) TRUCK SECURITY SYSTEM

(75) Inventor: Greg Haber, Woodbury, NY (US)

(73) Assignee: Babaco Alarm Systems, Inc., Moonachie, NJ (US)

( * ) Notice: Subject to any disclaimer, the term of this patent is extended or adjusted under 35 U.S.C. 154(b) by 361 days.

(21) Appl. No.: 11/699,164

(22) Filed: Jan. 29, 2007

(65) Prior Publication Data

US 2008/0179908 A1 Jul. 31, 2008

(51) Int. Cl.
*B60J 5/02* (2006.01)
(52) U.S. Cl. ............... 296/146.8; 296/146.1; 340/425.5; 340/568.1
(58) Field of Classification Search ............... 296/146.1, 296/146.8; 340/425.5, 568.1, 539.1
See application file for complete search history.

(56) References Cited

U.S. PATENT DOCUMENTS

| | | | |
|---|---|---|---|
| 5,721,550 A | 2/1998 | Lopez | |
| 6,727,806 B1 | 4/2004 | Massie et al. | |
| 2002/0178771 A1* | 12/2002 | Porter | 70/257 |
| 2003/0206104 A1 | 11/2003 | Lowry et al. | |
| 2004/0095227 A1* | 5/2004 | Lehman | 340/425.5 |
| 2005/0179546 A1* | 8/2005 | Lanigan et al. | 340/545.6 |
| 2005/0247085 A1* | 11/2005 | Porter | 70/210 |
| 2006/0220847 A1* | 10/2006 | Lanigan et al. | 340/545.6 |
| 2007/0075848 A1 | 4/2007 | Pitt | |
| 2007/0176793 A1* | 8/2007 | Bruch | 340/945 |
| 2008/0211642 A1 | 9/2008 | Harata et al. | |

FOREIGN PATENT DOCUMENTS

| | | |
|---|---|---|
| GB | 2 211 552 | 7/1989 |
| GB | 2 428 845 | 2/2007 |

* cited by examiner

*Primary Examiner*—Lori L Lyjak
(74) *Attorney, Agent, or Firm*—Robert L. Epstein; Epstein Drangel Bazerman & James, LLP

(57) ABSTRACT

The truck security system emits an audible alarm when a cargo door is open and a driver or other person working on the truck goes beyond a defined distance, generally the immediate vicinity, from the truck exposing cargo to possible theft. In a truck having more than one cargo door, an alarm is sounded if more than one door is open simultaneously. If an attempt is made to start the engine with a door open, the system sounds an alarm in the cab and ignition is prevented. The system includes sensing means to detect if cargo doors are opened or closed, control logic circuitry and a clock, a RF signal receiver, an ignition cut-off, an audible alarm and a battery to independently power the security system, all of which are situated on the truck.

61 Claims, 20 Drawing Sheets

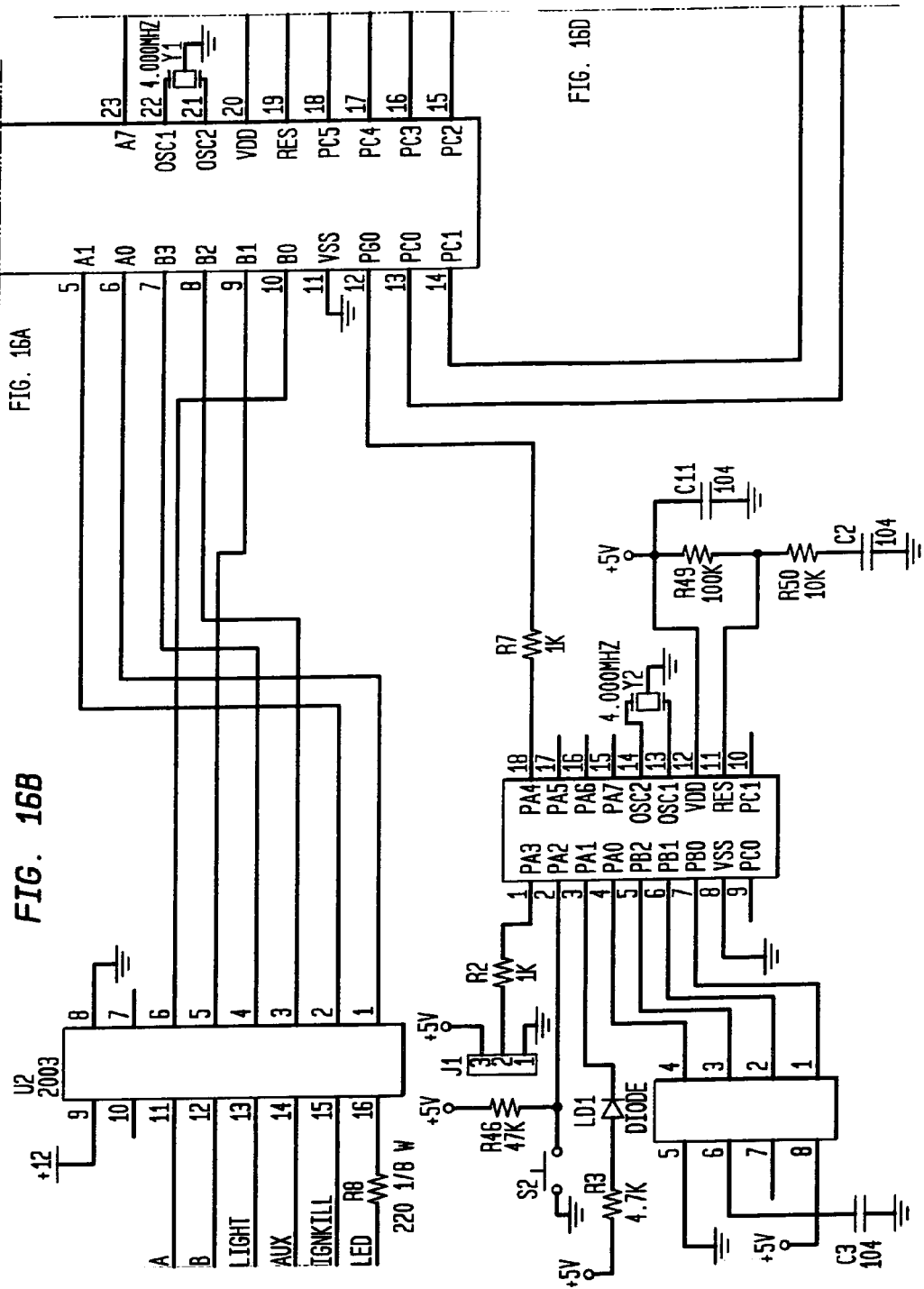

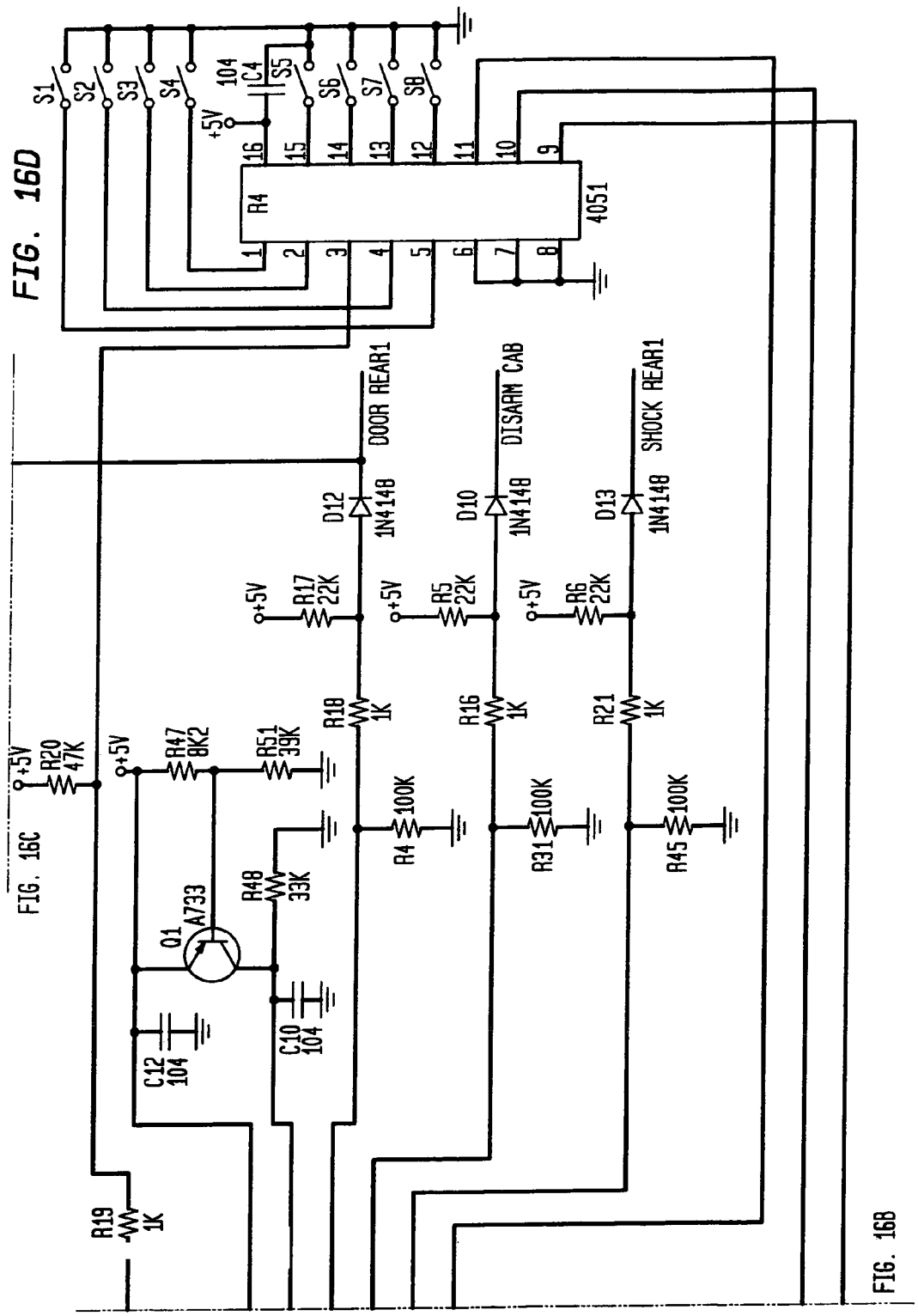

TRUCK SECURITY SYSTEM

BACKGROUND OF THE INVENTION

1. Field of the Invention

This invention relates to a security system to prevent theft or vandalism of cargo contained in a truck.

2. Description of Prior Art Including Information Disclosed Under 37 CFR 1.97 and 1.98

Security of cargoes transported by truck is of serious concern to the trucking industry. Trucks that are left unattended may be subjected to break-in resulting in theft of cargo and vandalism. In addition, truck doors may be inadvertently left open after a delivery or pick up resulting in loss of valuable cargo which falls from the truck in the course of transport and creates a safety hazard on streets and highways. If during the course of a delivery or pick up a cargo door is inadvertently left open, pilferage of valuable cargo may occur or the nature and content of the cargo may be disclosed to unauthorized individuals causing economic loss to the trucker and the trucker's customers.

When business documents are being transported for safe storage, recordation or destruction it is essential that there be no unauthorized disclosure of such documents whether due to inadvertent neglect, vandalism or theft. Such unauthorized disclosure may cause disastrous economic loss to businesses and individuals due to the disclosure of trade secrets, confidential business matters and personal information used for identity theft. Such unauthorized disclosure of documents in transport may also result in heavy economic losses to the transporter of the documents due to liability for such disclosures.

In the course of the work day during the loading, unloading and transport of cargo such as business documents from a truck, many occasions can occur that can lead to the inadvertent exposure and theft of the cargo. For example, a driver or other worker on the truck may leave the immediate vicinity of the truck in the normal course of business without realizing a cargo door is open. Another example is the case of a truck with multiple cargo doors at different points, such as at the side and rear of the truck, with more than one door inadvertently open at the same time thereby allowing exposure of cargo at one door while loading or unloading is done at the other door. In yet another example, a cargo door may be inadvertently left open while the driver starts the truck engine which can result in loss and exposure of cargo in transport and traffic accidents.

For the foregoing reasons there is a need for a truck security system that will alert a person working on a truck that a cargo door is open when that person has gotten too far from the truck to oversee the cargo.

There is also a need for a truck security system that will alert a person working on a truck that more than one cargo door is open.

There is also a need for a truck security system that a will alert a truck driver that a cargo door is open when the driver attempts to start the truck engine and will prevent the engine from starting until the cargo door is closed.

BRIEF DESCRIPTION OF THE INVENTION

It is an objective of the present invention to provide a security system for trucks and commercial vehicles that prevents inadvertent disclosure of the nature and content of cargo in a truck and potential theft of the cargo when a cargo door is left open and a person or persons working on the truck leaves the immediate general vicinity of the truck.

It is an objective of the present invention to provide a security system for trucks and commercial vehicles that prevents inadvertent disclosure of the nature and content of cargo in a truck and potential theft of the cargo in the case of a truck having multiple points of entry or doors to the cargo section when more than one door is left open.

It is also an objective of the present invention to provide a security system for trucks and commercial vehicles that prevents loss of cargo during transport resulting in inadvertent disclosure of the nature and content of cargo in a truck and potential theft and safety hazards when a cargo door is left open and the truck is driven.

It is a further objective of the present invention to provide a security system for trucks and commercial vehicles in which business documents are being transported for safe storage, recordation or destruction that prevents the unauthorized disclosure of such documents due to inadvertent neglect, vandalism or theft. Those objects are achieved by the present invention as follows.

In accordance with a first aspect of the present invention, there is provided a security system for a truck having a cargo section and a door to access the cargo section, the door having an open and a closed condition. The system includes: sensing means to detect the condition of the door and convey a signal according to the condition of the door to control means situated on the truck; means to receive RF signals situated on the truck and to convey the signals to the control means: alarm means situated on the truck; and battery means situated on the truck to independently power the security system. RF transmission means able to be carried by a person are provided. The RF transmission means are powered by portable battery means. The RF transmission means has an RF output range corresponding to a distance. The RF transmission means continuously transmits, at regular intervals, an RF signal receivable by the RF signal receiving means on the truck. The RF signal receiving means does not receive the RF signal when it is situated outside the output range distance of the RF transmission means. The control means includes means to process the signal according to the condition of the door, and timing means to determine if the RF signal is received by the RF signal receiving means within an interval of time that is within a first time interval, and means to transmit a signal to the alarm means, so that the alarm means emits an audible alarm, when the interval of time exceeds the first time interval, and the condition of the door is open at the same time.

The output range of the RF transmission means is continuously adjustable from a minimum to a maximum distance. The RF signal is continuously transmitted in groups of pulses having an interval of time between the groups of pulses. The interval of time monitored by the timing means is the interval between the groups of pulses.

The RF transmission means includes means to change the interval of time between the groups of pulses. The RF transmission means includes means to continuously transmit a RF signal that is continuous.

The RF transmission means includes means to transmit an override RF signal receivable by the RF signal receiving means. The control means includes means to reset the first preset value to a second value when the override RF signal is received by the receiving means so that the alarm means emits an audible alarm when the interval of time exceeds the second preset value, and the condition of the door is open. The second preset value is greater than the first preset value.

The RF transmission means includes means to transmit at least two distinct override RF signals receivable by the RF signal receiving means. It also includes means to select and separately transmit one of the at least two distinct override RF signals. Each override signal corresponds to a distinct increased preset value. Upon receipt of any one of the distinct override signals by the RF signal receiving means, the control means resets the first preset value to an increased value corresponding to the distinct override signal so that the alarm means emits an audible alarm when the interval of time exceeds the increased preset value, thereby delaying the emission of an audible alarm when the condition of the door is open.

The control means defaults to the first preset value in the absence of an override signal so that the alarm means emits an audible alarm when the interval of time exceeds the first value and the condition of the door is open.

One of the at least two distinct override signals is immediately transmitted with increased output range. A second one of the distinct override signals is a steady state signal immediately transmitted with increased output range.

The RF transmission means includes means to immediately transmit the pulsed signal with maximum output range.

The RF transmission means includes means to immediately transmit a steady state signal receivable by the receiving means. The control means includes means to increase the first preset value upon receipt of the steady state signal.

Preferably, a plurality of the RF transmission means are provided. Each RF transmission means transmits a distinct signal. The control means included means to recognize each signal. The alarm means emits an audible alarm when the condition of the door is open and no signal is received from any of the RF transmission means.

A plurality of portable RF transmission means may be provided. Each RF transmission means transmits a distinct signal. The control means includes means to recognize each signal. The alarm means emits an audible alarm when the condition of the door is open and no signal is received from any of the RF transmission means.

When the alarm means emits an audible alarm, and the RF signal is received by the RF signal receiver means in an interval of time corresponding to the first preset value, the control means silences the audible alarm when the condition of the door is open.

When the condition of the door is open, and the RF signal is received by the receiver means in an interval of time corresponding to the first preset value, the control means does not convey a signal to the alarm means to emit an audible alarm.

The output range of the RF transmission means is continuously adjustable from a minimum to a maximum distance. The RF signal is continuously transmitted in groups of pulses having an interval of time between the groups of pulses. The interval of time sensed by the system is the interval between the groups of pulses. When the condition of the door is open and the RF signal is received by the RF signal receiver means in an interval of time corresponding to the first preset value, the control means does not convey a signal to the alarm means to emit an audible alarm.

The control means comprises logic circuitry.

The output range of the transmitter is continuously adjustable from a minimum to a maximum distance. The RF signal is continuously transmitted in groups of pulses having an interval of time between the groups of pulses. The interval of time sensed by the system is the interval between the groups of pulses.

The control means includes means to deactivate the alarm means within a defined period providing the RF signal is received by the RF signal receiver means in an interval of time corresponding to the first preset value, thereby allowing the door having a closed condition to be opened without causing the alarm means to emit an alarm.

The control means also includes means to deactivate the alarm means within a defined period providing the RF signal is received by the RF signal receiving means in an interval of time corresponding to the first preset value, thereby allowing the door having a closed condition to be opened without causing the alarm means to emit an alarm. The control means includes means to automatically reactivate the alarm when the door having an open condition is closed.

The control means also includes means to deactivate the alarm means within a defined period providing the RF signal is received by the RF signal receiving means in an interval of time corresponding to the first preset value, thereby allowing the door having a closed condition to be opened without causing the alarm means to emit an alarm. The control means also has means to automatically reactivate the alarm when the door having an open condition is closed and the control means comprises logic circuitry.

The output range of the RF transmission means is continuously adjustable from a minimum to a maximum distance. The RF signal is continuously transmitted in groups of pulses having an interval of time between the groups of pulses. The interval of time sensed by the system is the interval between the groups of pulses. The control means has means to deactivate the alarm means within a defined period providing the RF signal is received by the RF signal receiving means in an interval of time corresponding to the first preset value, thereby allowing the door having a closed condition to be opened without causing the alarm means to emit an alarm.

The output range of the transmitter is continuously adjustable from a minimum to a maximum distance. The RF signal is continuously transmitted in groups of pulses having an interval of time between the groups of pulses. The interval of time sensed by the system is the interval between the groups of pulses. The control means has means to deactivate the alarm means within a defined period providing the RF signal is received by the RF signal receiving means in an interval of time corresponding to the first preset value, thereby allowing the door having a closed condition to be opened without causing the alarm means to emit an alarm and the control means further comprises means to reactivate the alarm when the door having an open condition is closed.

The output range of the RF transmission means is continuously adjustable from a minimum to a maximum distance. The RF signal is continuously transmitted in groups of pulses having an interval of time between the groups of pulses. The interval of time sensed by the system is the interval between the groups of pulses. The control means has means to deactivate the alarm means within a defined period providing the RF signal is received by the RF signal receiving means in an interval of time corresponding to the first preset value, thereby allowing the door having a closed condition to be opened without causing the alarm means to emit an alarm. The control means has means to reactivate the alarm when the door having an open condition is closed.

The RF signal is digitized.

The output range of the RF transmission means is continuously adjustable from a minimum to a maximum distance. The RF signal is digitized and continuously transmitted in groups of pulses having an interval of time between the groups of pulses. The interval of time sensed by the system is the interval between the groups of pulses.

In accordance with another aspect of the present invention, a truck security system is provided. The security system is designed for use on a truck having a cargo section and a door to access the cargo section. The door has an open and a closed condition. Sensing means are provided to detect the condition of the cargo door and to convey a signal according to the condition of the door to control means situated on the truck. The system also includes control means, means to receive RF signals and to convey the signals to the control means, alarm means, and RF transmission means able to be carried by a person. The RF transmission means is powered by portable battery means. The RF transmission means has an RF output range corresponding to a distance. The output range is continuously adjustable from a minimum to a maximum distance. The RF transmission means continuously transmits an RF signal in groups of pulses having a regular interval between the groups of pulses. The signal is receivable by the RF receiving means. The RF signal receiving means does not receive the RF signal when it is outside the distance. The control means has means to process the signal according to the condition of the door, timing means to determine if the interval of time between the groups of pulses is within a first preset value, and means to transmit a signal to the alarm means causing the alarm means to emit an audible alarm when the interval of time exceeds the first preset value, and the condition of the door is open.

The RF signal is digitized. The RF transmission means includes means to continuously transmit an RF signal that is continuous.

The RF transmission means has means for transmitting a distinct override signal receivable by the RF signal receiving means. The control means includes means to increase the first preset value when the override signal is received by the RF signal receiving means. That causes any audible alarm to be halted until the interval of time exceeds the increased preset value.

Preferably, the RF transmission means includes means to transmit at least two distinct override signals that are receivable by the RF signal receiving means. Each override signal corresponds to a distinct increased preset value. It also has means to select and separately transmit one of the at least two distinct override RF signals, wherein on receipt of any one of the distinct override signals by the receiving means. The control means resets the first preset value to an increased value corresponding to an increased interval of time corresponding to the distinct override signal. That causes the alarm means to emit an audible alarm when the interval of time exceeds the increased value, thereby delaying the emission of an audible alarm.

Upon receipt of any one of the distinct override signals by the RF signal receiving means, the control means resets the first preset value to an increased value corresponding to an increased interval of time corresponding to the distinct override signal so that the alarm means emits an audible alarm when the interval of time exceeds the increased value thereby delaying the emission of an audible alarm. The control means automatically defaults to the original preset value in the absence of an override signal, so that the alarm means emits an audible alarm when the interval of time exceeds the original value.

One of the at least two distinct override signals is a pulsed signal that is immediately transmitted with increased output range. A second one of the distinct override signals is a steady state signal that is immediately transmitted with increased output range.

The RF transmission means has means to immediately transmit the pulsed signal with maximum output range. It also has means to immediately transmit a steady state signal that is receivable by the RF signal receiving means. The control means includes means to increase the first preset value upon receipt of the steady state signal.

The security system may include a plurality of the RF transmission means. Each RF transmission means transmits a distinct signal. The control means has means to recognize each signal. The alarm means emits an audible alarm when the condition of the door is open and no signal is received from any of the RF transmission means.

When the alarm means is emitting an audible alarm, and the RF signal is received by the RF signal receiver means in an interval of time corresponding to the preset value, the control means halts transmission of an alarm signal to the alarm means thereby silencing the audible alarm.

When the condition of the door is open and the RF signal is received by the RF signal receiver means in an interval of time corresponding to the first preset value, the control means will not cause the alarm means to emit an audible alarm.

The control means comprises logic circuitry.

The control means includes means to deactivate the alarm means within a defined period, providing the RF signal is received by the RF signal receiver means in an interval of time corresponding to the first preset value. That allows the door having a closed condition to be opened without causing the alarm means to emit an alarm.

The control means also includes means to automatically reactivate the alarm when the door having an open condition is closed.

The control means has means to manually increase the first preset value without an RF override signal.

In accordance with another aspect of the present invention, a security system is provided for a truck of the type having a cargo section and a door to access the cargo section, the door having an open and a closed condition, a cabin, an engine and an ignition system to start the engine. The system includes: control means; means for sensing the condition of the cargo door and for conveying a signal according to the condition of the door to the control means; means for sensing when the ignition system is activated and for conveying a signal to the control means that the ignition system is activated; ignition system disabling means, alarm means situated in the cabin, and battery means situated on the truck to independently power the security system. The control means has means to process the signals and for transmitting a signal to the alarm means causing emission of an alarm, for transmitting a signal to the ignition system disabling means to disable the ignition system, when the door is open and the ignition system is simultaneously activated.

The alarm is an audible alarm.

When the condition of the door is closed, the control means does not transmit a signal to the alarm means to emit an alarm. It also does not transmit a signal to the ignition system disabling means to disable the ignition system.

The control means comprises logic circuitry.

In accordance with another aspect of the present invention, a security system is provided for a truck of the type having a cargo section and a first and a second door to access the cargo section, each the door having an open and a closed condition. The system includes: control means; means for sensing the condition of each the doors and for conveying signals representative of the condition of each door to the control means situated on the truck; alarm means situated on the truck, and battery means situated on the truck to independently power the security system. The control means has means for processing the signals and for causing the alarm means to emit an alarm when both the doors are open.

The alarm is an audible alarm.

The control means comprises logic circuitry.

In accordance with another aspect of the present invention, control apparatus for a truck security system is provided. The truck is of the type having at least one cargo door and an ignition system. The control apparatus is situated on the truck and is powered by independent battery means. The control apparatus includes circuit means for receiving and processing signals from at least one cargo door sensing means. The cargo door sensing means signals a condition for each of the at least one cargo door, the condition being selected from open or closed for each of the at least one cargo door. The apparatus includes RF signal receiving means; circuit means for receiving and processing signals from the RF signal receiving means; and timing means for measuring any interval of time between receipt of the RF signals and for sending a signal to alarm means, if the time interval exceeds a preset value. Circuit means are provided for receiving and processing signals from ignition system sensing means, the ignition system sensing means signaling if the ignition system is activated. Further, circuit means for determining if an alarm condition exists by processing signals from the cargo door sensor means, from the RF signal receiving means, from the timing means and from the ignition sensing means are provided. The determining circuit means transmits signals to activate alarm means in response to an alarm condition. Means are also provided to inactivate the ignition system, in response to an alarm condition. Switching means are provided to enable and disable the determining circuit means, thereby determining the response of the control apparatus to the signals transmitted thereto.

The present invention also has circuit means to alter the preset value. Those circuit means are activated by one or more distinct reset signals received by the RF signal receiving means or by manual reset means.

The circuit means comprises logic circuitry and the signals are digitized.

BRIEF DESCRIPTION OF THE SEVERAL VIEWS OF DRAWINGS

To these and to such other objects that may hereinafter appears, the present invention relates to Truck Security System as described in detail in the following specification and recited in the annexed claims, taken together with the accompanying drawings, in which like numerals refer to like parts and in which:

Figure 17A:
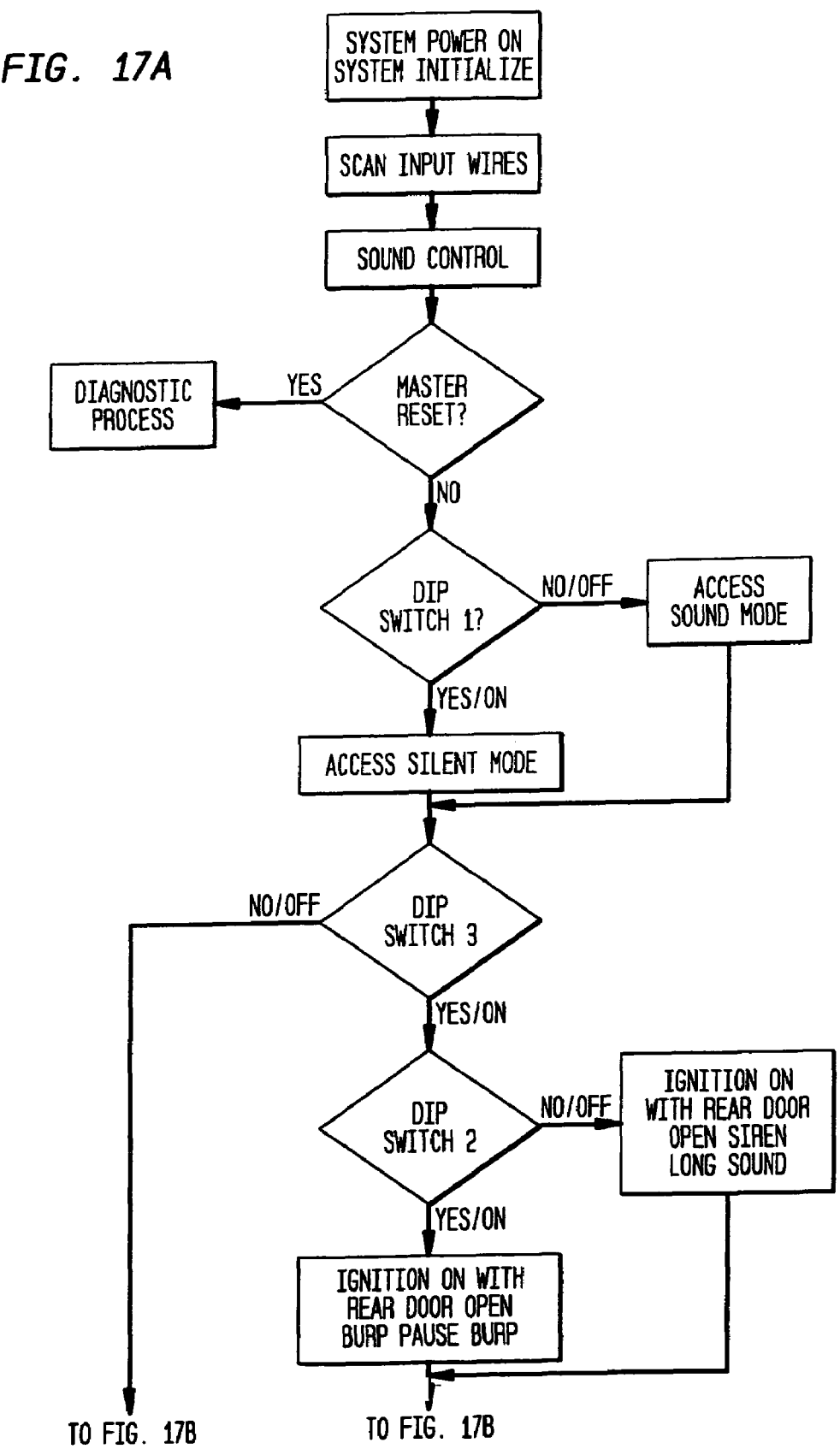
Figure 17B:
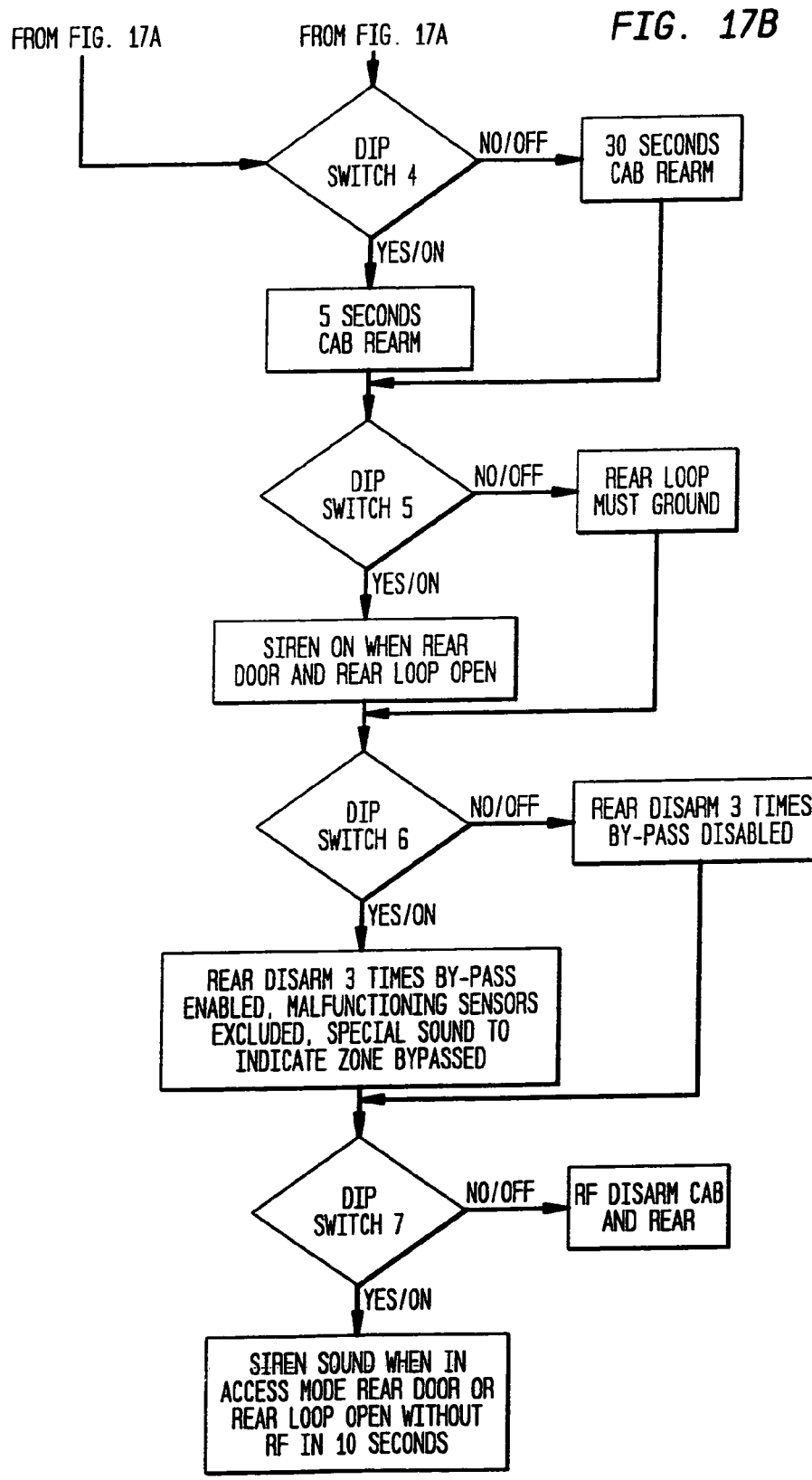
Figure 18:
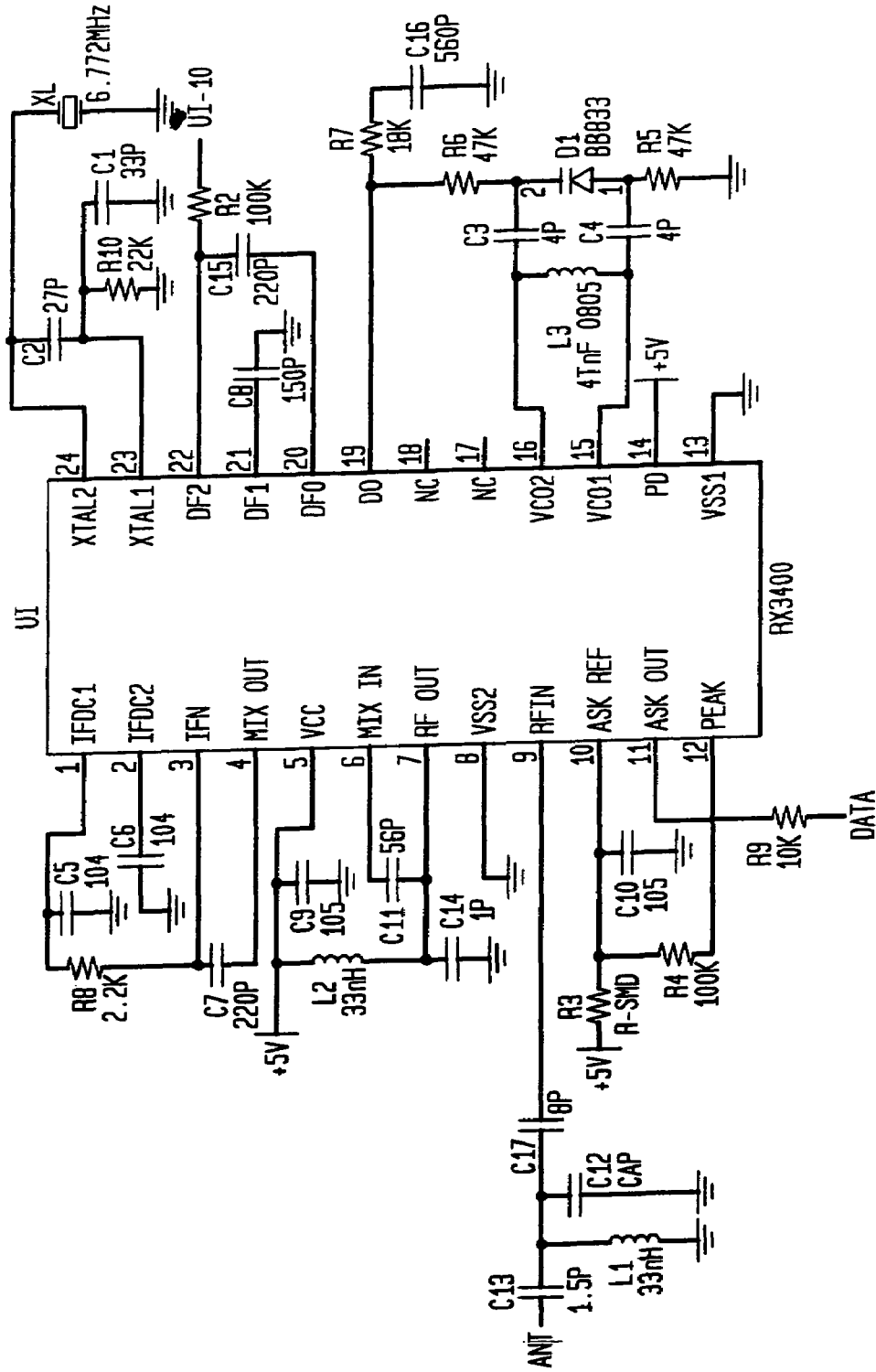
Figure 19:
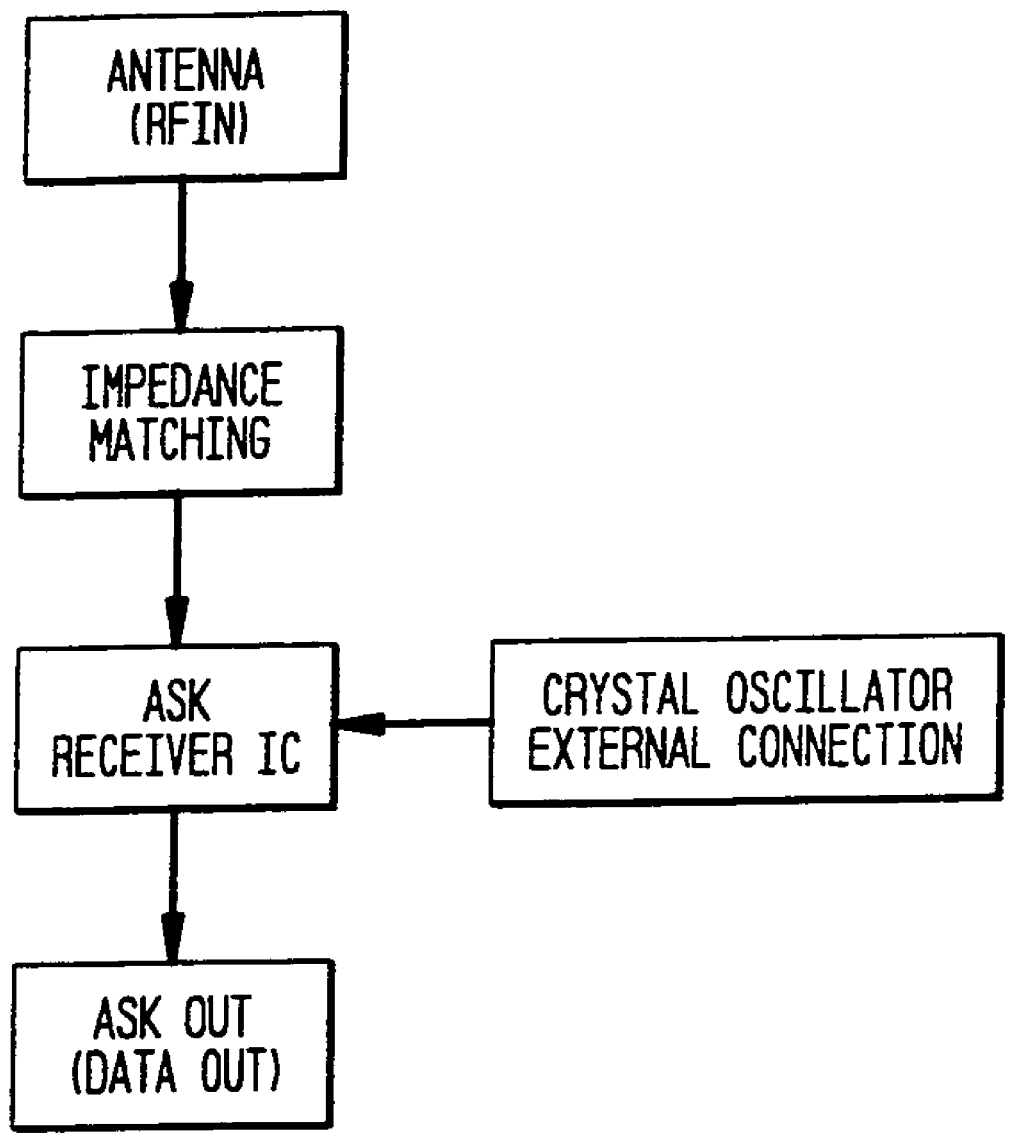

FIGS. 16A through 16D together form a schematic diagram of a preferred embodiment of the main control module;

FIGS. 17A and 17B together form an overall flow chart depicting the functions of the software in the preferred embodiment of the main control module;

FIG. 18 is a schematic diagram of a preferred embodiment of the RF signal receiver; and FIG. 19 is a flow block diagram illustrating the processing of an RF signal received from a RF transmitter by a RF signal receiver.

DETAILED DESCRIPTION OF THE INVENTION

Figure 1:
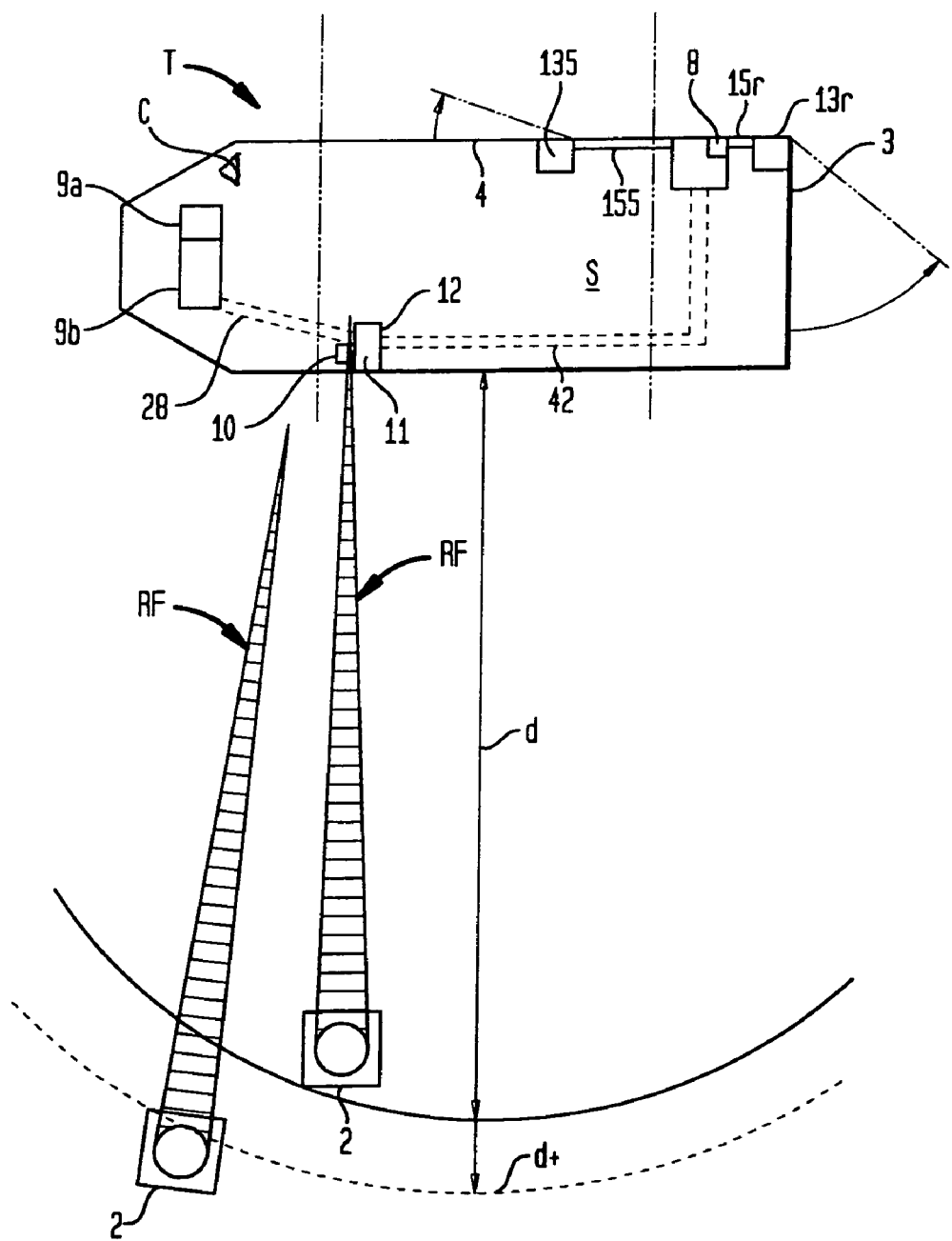
FIG. 1 is a top view schematic depiction of the general disposition of the components of the security system in a truck and the proximity detector.

FIG. 1 is an overview schematic representation of the general layout of the components of the security system of the present invention. The system is designed for use on a truck, generally designated T, of the type having a cab, generally designated C, and a cargo section, generally designated S.

Cargo section S has a rear cargo door 3 and a side cargo door 4. Sensor means 13r is provided to sense if the rear cargo door 3 is open or closed. Sensor means 13s is provided to sense if the side door 4 is open or closed. Sensor means 13r and 13s are typically magnetic switches, as is known in the art. However, other types of sensors known in the art may be used to detect if either door or both doors are open or closed.

Sensor means 13r and 13s are electrically connected to an entry/reset switch module 8 by means of electrical connection means 15r and 15s, which are typically electrical cables, and to a main control module 12 by electrical connection means 42, which is typically a multiwire cable. Main control module 12 is typically contained in an alarm box 10.

FIG. 1 also shows the a cab alarm means 9a and an ignition cut-off means 9b, which are typically located in cab C or under the hood of truck T. Those components are connected to main control module 12 by electrical connection means 28, which is also typically a multiwire cable.

FIG. 1 illustrates the interaction between a battery powered portable RF transmission means or proximity detector 2, which is typically carried by a person working on said truck T, and a RF signal receiver 11 situated in or on alarm box 10 located on truck T. Although not shown in FIG. 1, RF signal receiver 11 is connected to an RF antenna through a port in alarm box 10.

As is schematically depicted in FIG. 1, portable RF transmission means 2 has an output range corresponding to a distance d within which the RF transmission is receivable by RF receiving means 11 situated on truck T. However, at a distance greater than d, depicted as d+ in FIG. 1, the RF transmission from portable transmission means 2 is not received by receiving means 11.

In the truck security system of the present invention, portable RF transmission means 2 continuously transmits signal bursts at regular intervals. The signal transmitted from means 2 is pulsed or digitized. Preferably the signal is a digitized signal containing discrete data sets, or is a digitized coded signal. When it is within range, the signal from the RF transmission means 2 is receivable by RF receiving means 11. Means 11 is an RF receiver capable of receiving the pulsed or digitized RF signal and for converting it to an electrical signal which is then sent to control module 12 for further processing.

Portable RF transmission means 2 is a battery operated RF transmitter that once activated, continuously transmits a digitized signal at regular intervals on frequencies that can be used for commercial security purposes, preferably at or around 433.92 MHz. For the sake of convenience and ease of use, the transmitter is preferably compact and light enough to be carried on a key ring by a person.

Figure 11:
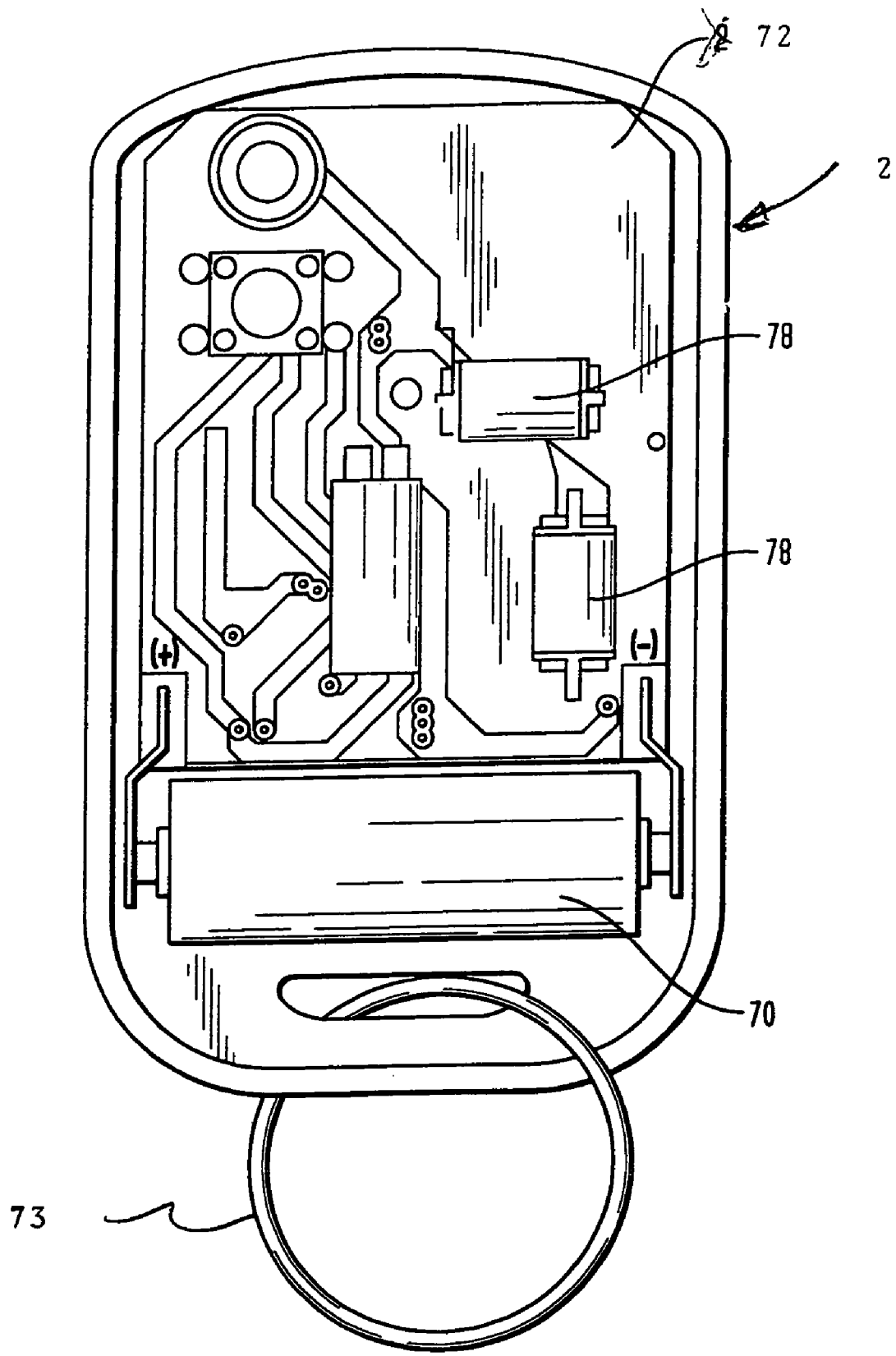
FIG. 11 is a general view of the interior of a preferred embodiment of a portable RF transmitter.
Figure 12:
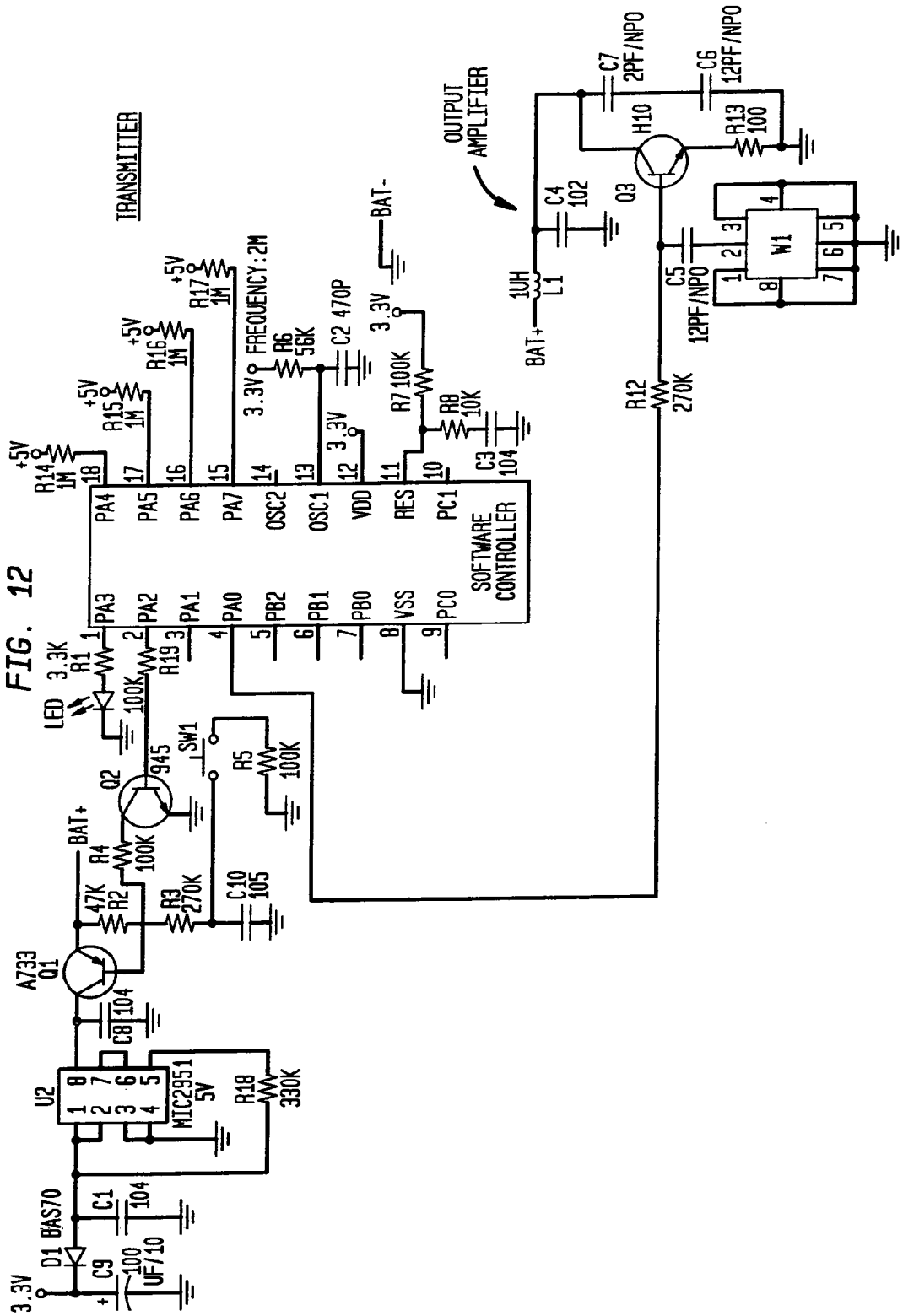
FIG. 12 is a schematic diagram of a preferred embodiment of a portable RF transmitter.

FIG. 11 shows a preferred embodiment of RF transmission means 2. It includes battery means 70. The battery means is selected from commercially available disposable or rechargeable batteries. Such batteries have an output voltage of from 1.5 to 12 volts, as required by any particular embodiment of RF transmitter 2, preferably 12V to permit maximum transmitter range. The transmitter also has a PC board 72 which includes power management circuitry, a CPU and output amplifier circuitry (see FIG. 12), an activation and function control button (SW1, as shown in FIG. 12), LED (also shown in FIG. 12) to indicate activation, on/off status, and motion sensing means 78.

Figure 13:
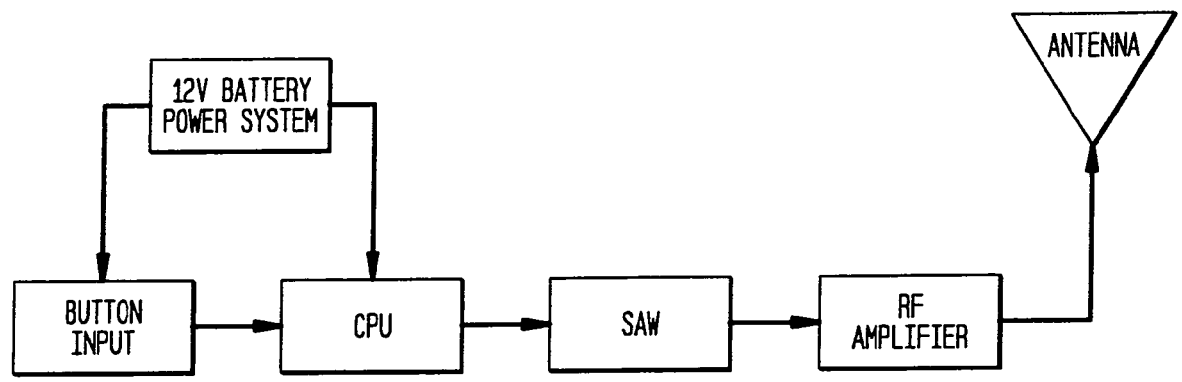
FIG. 13 is block diagram of a preferred embodiment of a portable RF transmitter.

FIG. 13 is a block diagram of the basic electronic functions of the RF transmitter. Motion sensing means 78, as depicted in FIG. 11, are arranged orthogonally to detect motion or physical shock along two (x and y) axes. However, the motion sensing means may also comprise an array of sensors arranged to detect motion or physical shock along x, y and z axes.

The motion sensing means may be mercury switches (as depicted in FIG. 11), geographic magnets, rolling ball sensors or any other type of motion sensor known in the art. However, the motion sensors must be arranged to sense motion or shock along at least two axes, must fit into the portable RF transmitter and must produce an electrical signal indicating that motion or physical shock has been sensed. Mercury switch motion sensors are preferred as they are readily available, economical and compact.

In order to extend the usable service life of battery means 70, RF transmitter 2 includes circuitry and logic means, as known in the art, to put RF transmitter 2 into "sleep mode" during which energy drawn from battery means 70 is drastically reduced, if no motion or physical shock is sensed from motion sensors 78 along at least two axes during a preset time period. That preset time period may range from about 5 minutes to about 30 minutes, but is preferably about 20 minutes so that battery energy is conserved without causing undue inconvenience to the driver or other personnel using the transmitter.

The finite transmission range or output of the portable RF transmitter permits it to function as the proximity detector component of the security system. The range of the transmitter is from about zero to about 70 yards, preferably from about 10 yards to about 60 yards, and most preferably from about 20 yards to about 50 yards. The range is preferably continuously adjustable by standard means known in the art, such as by changing the power output.

It is preferred that the RF transmitter be easily carried or worn by a person, for example, on a key ring 73, and transmit automatically, that is, once activated, it continuously transmits a digitized signal at regular time intervals. RF receiving means 11 receives the RF signal transmitted from RF transmission means 2 having output range d, as long as RF receiving means 11 remains within range d of the transmitter.

The transmitted RF signal preferably comprises groups of pulses having a regular and constant interval of time between each group of pulses. Typically, it is a digitized signal containing sets of data. Multiple sets of data are transmitted with each transmission burst or pulse. Each transmission burst or pulse contains from about 1 to about 10 sets of data, preferably about 3 sets of data, with each set of data including from 1 to 5 bytes, preferably 3 bytes. Preferably, the transmitter sends an RF signal burst or pulse about every 4 seconds to about every 12 seconds, preferably about every 6 seconds to about every 10 seconds and most preferably about every 8 seconds, the burst or pulse containing at least 3 sets of data with each set of data including 3 bytes.

That transmission pattern enables the transmitter to overcome certain RF transmission conditions encountered in practice, during a cargo pick up or delivery, that may interfere with signal reception by receiver 11, which is programmed to signal an alarm condition if a minimum of one data set (3 bytes) is not received within a preset time period, as discussed below.

Figure 14:
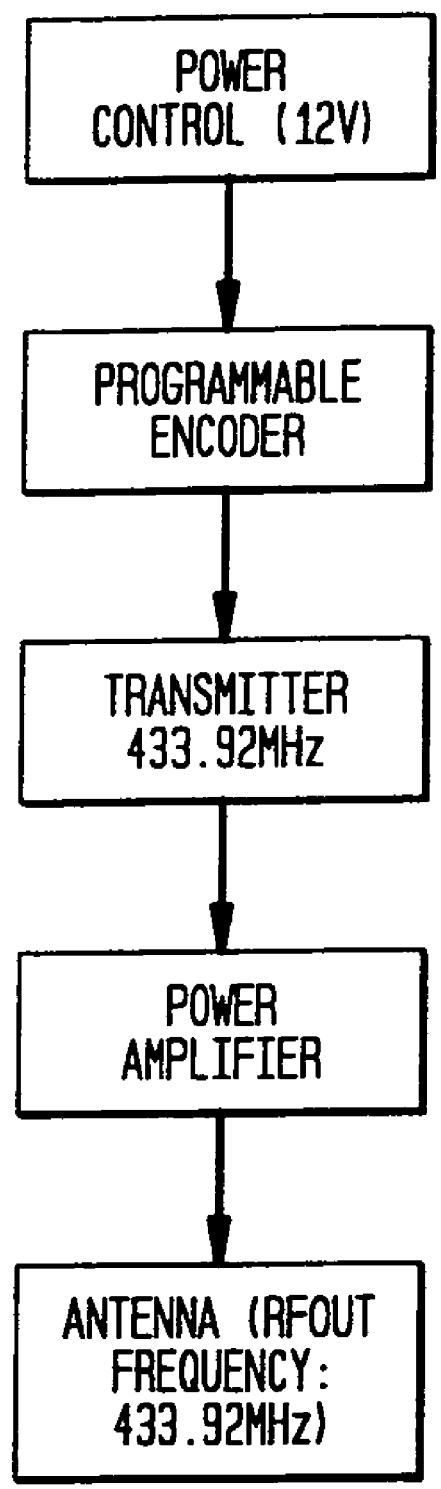
FIG. 14 is a flow block diagram depicting transmission of a signal from a preferred embodiment of a portable RF transmitter.

FIG. 14 is a flow block diagram illustrating the transmission of a signal from the portable RF transmitter of the truck security system on activation or power up.

RF receiving means 11 conveys signals received from the transmitter to control module 12. The control module includes a clock or timing means, preferably timer circuitry, to time the interval of time between groups of pulses in the received RF signal. Typically, the timing means is set so that the digitized or pulsed signal from the RF transmitter must be detected at least once in an interval of about 8 to about 11 seconds, preferably at least once in an interval of about 9 to about 10 seconds, to prevent an alarm signal when either cargo door 3 or 4 is open or unlocked.

Control module 12 processes the signals from sensor means 13r, which indicate if rear door 3 is open and unlocked or is closed and locked, and from sensor means 13s, which indicate if side door 3 is open and unlocked or is closed and locked. Control module 12 sends an alarm signal to alarm means within alarm box 10 causing the alarm means to sound an audible alarm when the timing means indicates that the interval of time between groups of pulses received by receiving means 11 exceeds a preset or fixed value that is about equal to the interval of time between the transmitted groups of pulses, and a signal is simultaneously received from sensing means 13r or 13s that either rear door 3 or side door 4 is open or unlocked.

In this manner, a person working on the truck and carrying the RF transmitter is alerted by an audible alarm if they have gone too far from the truck when a door has been left open and unlocked. By moving closer to truck T so that RF receiving means 11 is within range d of portable RF transmission means 2, the condition that caused the audible alarm will be eliminated and the audible alarm will be halted because the timing means within control module 12 will again detect groups of transmitted pulses having a time interval between them that is about equal to or less than said preset value.

Although FIG. 1 depicts the case of a truck T having two cargo doors, those skilled in the art will recognize that the above described proximity alarm feature of the truck security system of the present invention applies equally to the case of trucks having one cargo door or more than two cargo doors as only one open or unlocked door is required for an alarm when RF transmitter 2 is simultaneously at a distance from RF receiver 11 that is greater than output range d.

A battery powered portable RF transmission means 2 must be worn or carried by at least one person, preferably the driver, working on the truck T. To assure optimal security, each of the persons working on truck T must wear the portable RF transmitter, with each transmitter transmitting a distinct coded digitized signal that is recognizable by main control module 12.

To facilitate recognition of each distinct coded signal, control module 12 incorporates code learning circuitry in the manner as is known in the art. Control module 12 can therefore recognize a plurality of coded RF signals, generally from 1 to about 5 coded signals, preferably about 3, such signals to allow for work efficiency while providing security to the truck cargo. In the event that any one of the plurality of distinct truck signals is not received within the aforesaid preset time while a door on truck T is open, an audible alarm will sound indicating a door is open.

RF transmission means 2 also includes means to delay or prevent the sounding of an alarm under certain conditions. Those means include means to momentarily increase signal strength so that the range of the transmitter is increased, means to immediately send a signal without delay and means to override or change the preset time during which a signal must be received by RF receiver 11 in order to prevent the sounding of an alarm.

The aforesaid means to delay or prevent the sounding of an alarm when a cargo door is open are, for example, useful in practice during the unloading or loading of a truck when the immediate area in which the truck is parked manifests conditions which interfere with reception by RF receiver 11 of the relatively weak RF signals transmitted by the RF transmitter, or when it is necessary for the person carrying the RF transmitter (an authorized person) to momentarily go beyond the range d of the transmitter. As is known in the art, the range d of an RF transmitter may be increased by increasing the signal strength. The RF transmitter is adjusted to normally operate substantially below maximum signal strength but is equipped with switching means, typically a pushbutton, which activates circuitry that immediately increases signal strength to about the maximum, thereby increasing output range d and overcoming interference with reception of the RF signal by receiver 11.

The switching means, typically an activation button, is arranged using methods and procedures known in the art to provide different responses according to the duration of activation or with reference to a button, the response will be different depending on how long the button is depressed. The RF transmitter may be programmed to respond in different ways according to the duration of a signal generated by the switching means, typically a push button.

The circuitry in the RF transmitter (see FIG. 12) may, for example, be programmed to so that by pressing pushbutton SW1 quickly, that is for about 0.5 seconds, transmitter 2 immediately transmits the RF signal at maximum output for a short period, for example, about 20 seconds to about 30 seconds or any other suitable value, and will transmit at least 5 data sets with each transmission burst, thereby delaying the sounding of the alarm when cargo door 3 or 4 is open.

By pressing the pushbutton for a longer time, for example, at least about 2 seconds, a coded RF signal is immediately transmitted at maximum output which temporarily resets the timer in control module 12 to allow a greater interval of time between the reception of RF signal pulses from the RF transmitter before sounding an alarm. In this manner, the timer may be reset to allow, for example, about 20 seconds to about 30 seconds or any other suitable value, between the receipt of signal pulses from the RF transmitter. In the absence of the coded signal, the timer defaults to its initial value.

Figure 15:
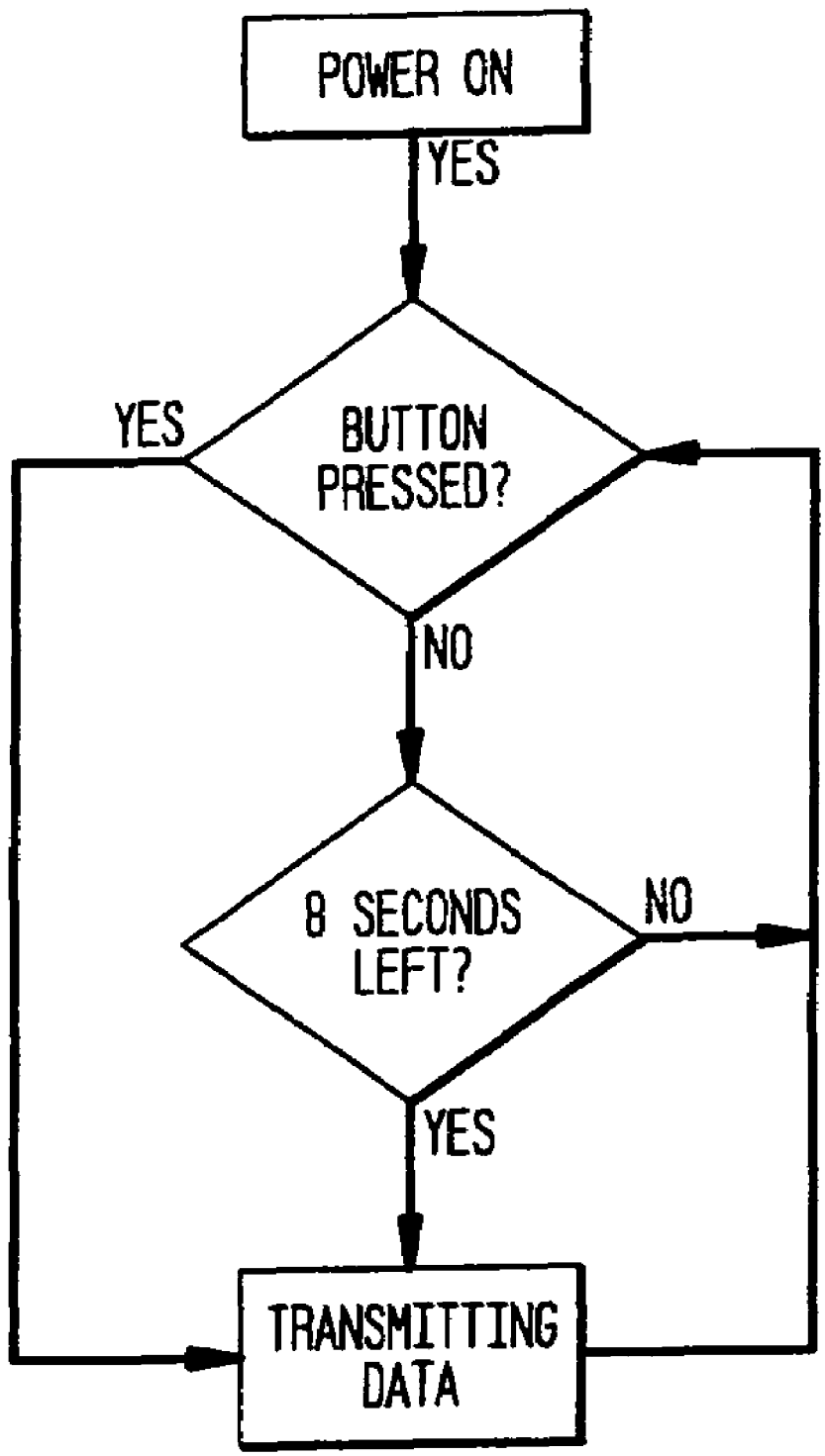
FIG. 15 is a flow chart depicting a basic data transmission sequence for a preferred embodiment of a portable RF transmitter.
Figure 16A:
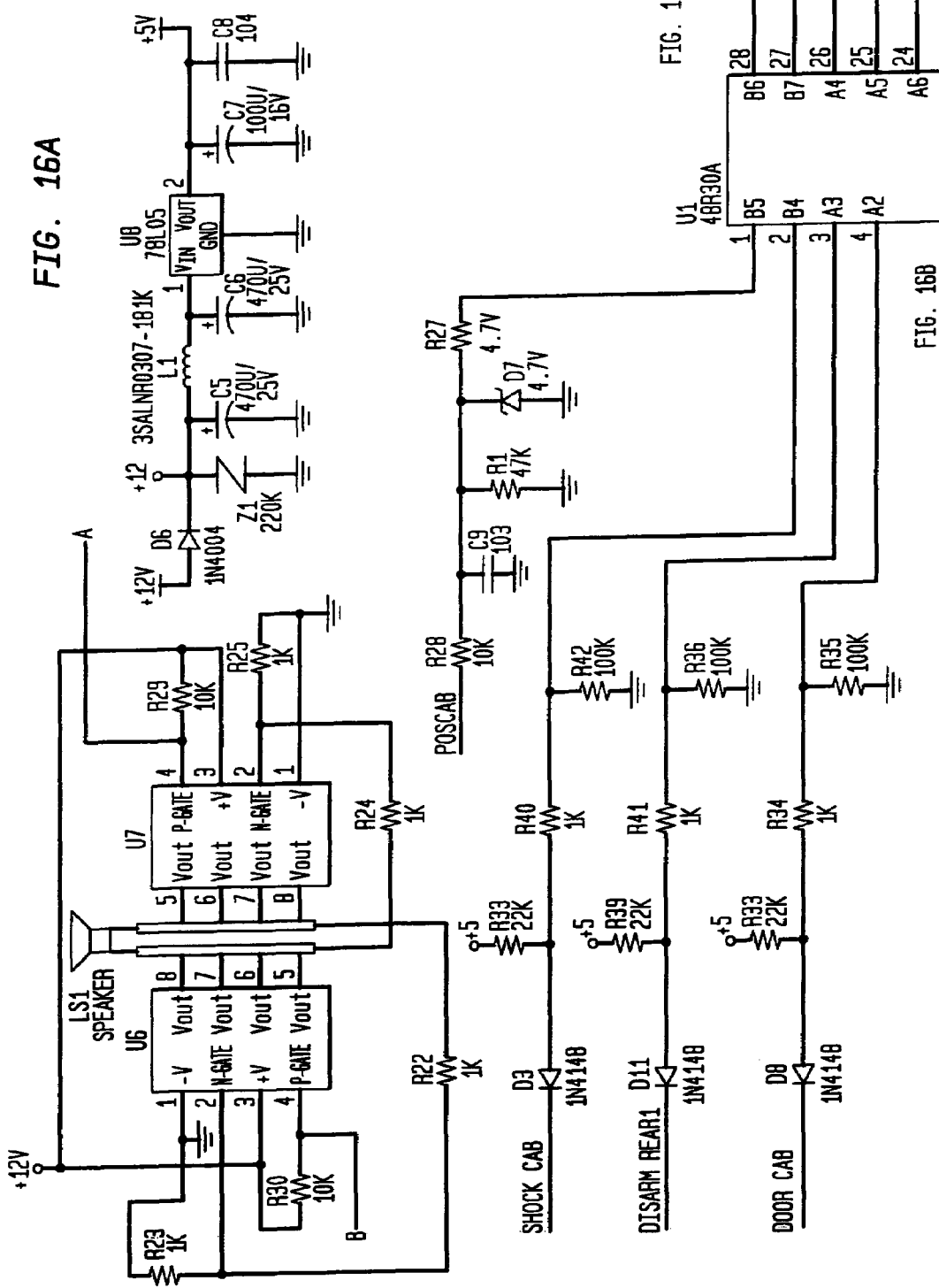
Figure 16C:
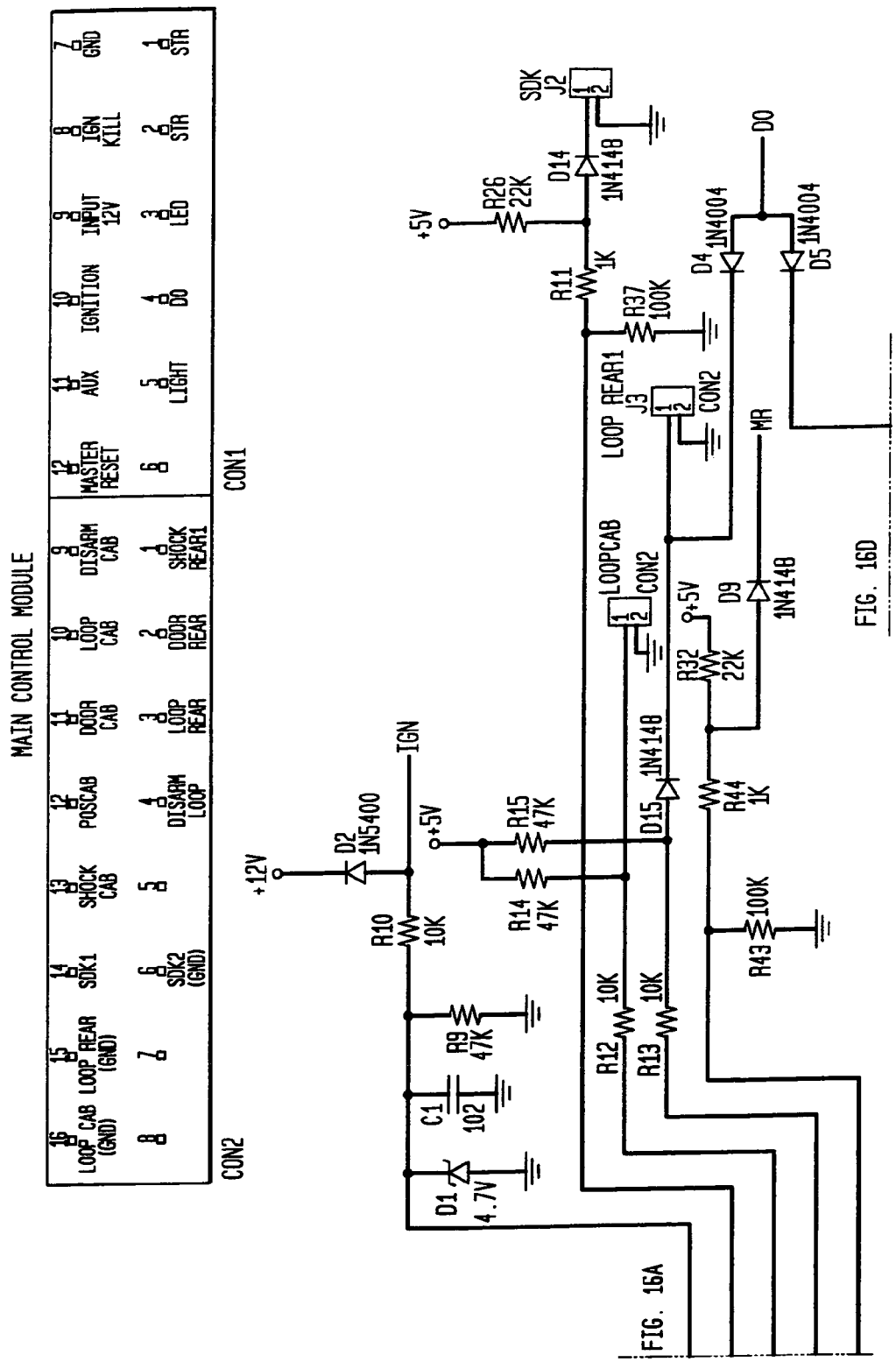

In this way, the truck alarm system of the present invention can provide a small amount of additional time for an authorized person to complete a task under the aforementioned conditions and delay the sounding of an alarm in areas that interfere with the reception of RF signals from the RF transmitter. Another effect of holding button SW1 down for an extended time is a change in the transmission pattern of the transmitter, such that an approximately 20 millisecond delay is produced in between each set of data in order for the receiver to recognize the transmission frequency. A flow chart depicting a basic data transmission sequence for an embodiment of transmitter 2 is given in FIG. 15.

Controller module 12 also includes means to reset the timer in the absence of an RF override signal from RF transmitter 11. Typically, lock and key means are arranged on entry/reset switch module 8 so that a driver or other authorized person having the proper key can reset the timer means in control module 12 by turning a key in a lock on 8 so that a greater interval of time between groups of RF pulses received by RF receiver 11 is temporarily required before an audible alarm is sounded when a cargo door 3 or 4 is simultaneously open. Other means to reset the timer circuitry as known in the art such as a keypad on which a code is inserted may also be used for the manual override.

In another configuration or setting of control module 12, controlled by switching means in the form of a DIP switch, the RF signal from the RF transmitter is used to disarm or inactivate the audible alarm and gain access to the cargo section of truck T when the cargo door or doors, as exemplified by doors 3 and 4 of FIG. 1, are closed. In that configuration, the RF transmitter does not act as a proximity detector. Instead, when RF receiver 11 receives signals within a time corresponding to a preset value, the cargo section of truck T can be accessed for a short period, typically 10 seconds to 30 seconds, preferably about 20 seconds to allow sufficient but not excessive time for an authorized person to respond, by opening door 3 or 4 without causing an alarm to sound.

During the access mode, control module 12 causes the alarm means to sound a distinctive access signal. If cargo door 3 or 4 is not accessed during the preset time period for access, logic circuitry in the control module resets the alarm to sound if door 3 or 4 is opened and halts the audible access signal. If the cargo section is accessed by opening either door 3 or door 4 during the access period, control module 12 halts the audible access signal. The open condition of door 3 and/or door 4 is detected by the control module via signals conveyed by sensors 13*r* and 13*s*. At the time door 3 and/or door 4 is closed, the control module circuitry resets an alarm to sound in the event of unauthorized opening of either door. In this manner, the cargo door alarm is passively reactivated without need of active intervention from the truck driver or another person.

With further reference to FIG. 1, the truck security system of the present invention also has means to alert a driver, and prevent a truck from being driven when a driver attempts to start the engine with either door 3 or door 4 in cargo section S of truck T still open. Those means include cabin alarm means 9*a* that produces a unique alarm sound, typically a buzzer, that is associated with an open door that sounds in cabin C of truck T when cargo door 3 or cargo door 4 in cargo section S is open. Those means also include ignition cut-off means 9*b* located in the cab and under the hood of truck. Control module 12, which has logic circuitry to send an alarm signal when a cargo door is open and a simultaneous attempt is made to start the engine, is connected to door sensor 13*r* and door sensor 13s by means of electrical connecting means 14r, 15s, and 42 via entry/reset switch module 8.

Ignition cut-off means 9b is connected to the ignition system of truck T and to control module 12 via electrical connection means 28. Typically, the security system has a key activated module or secondary ignition system that forms part of the ignition cut-off system 9b and requires a separate ignition key. As will be recognized by those skilled in the art, other methods known in the art such as a coded key pad may be used to activate the secondary ignition system. To start truck T, the driver must typically first activate the secondary ignition system by means of a separate second key and then turn the normal truck ignition key. If cargo door 3 or 4 is open during engine ignition, logic circuitry in control module 12 will sound a distinct alarm via alarm means 9a within cab C, typically a buzzer, to warn the driver of the open door and will activate ignition cut-off 9b to prevent the truck from starting. When the open door in cargo section S is closed, the audible alarm in the cab is stopped, ignition of the engine is permitted, and the alarm is reset by logic circuitry in control module 12.

Referring again to FIG. 1, the security system of the present invention also has means to a alert a driver or other person working on a truck T of the type which has a cargo section S with at least two points of entry to the cargo section, such as cargo door 3 and cargo door 4, that more than one of those cargo doors is open at a given time. Signals sent by door sensors 13r and 13s to control module 12 are processed by the control logic circuitry to activate the alarm means, typically contained within alarm box 10, to sound an audible alarm when more than one door in cargo section S is simultaneously open.

Thus, the control module will cause an audible alarm to sound when cargo doors 3 and 4 are simultaneously open. The audible alarm is halted by closing all doors except one. In the example depicted in FIG. 1, if both cargo doors 3 and 4 are simultaneously open the logic circuitry in control module 12 causes an audible alarm to sound. That alarm is halted when the logic circuitry receives a signal from either door sensor 13r or 13s that either of the doors is closed. That audible alarm may be emitted with a distinctive sound indicating that more than one door in cargo section S is open. In this manner, the security system of the present invention alerts authorized personnel working on the truck to an insecure condition and motivates the personnel to correct that condition.

Again with reference to FIG. 1 the security system may also include means to discourage removal of the secondary ignition key from the secondary ignition system when the engine of truck T is running. When the truck's engine is running with both the normal ignition key present in the normal ignition system and the secondary key present in the secondary ignition system, a further function of the logic circuitry contained in control module 12 causes an alarm to sound from alarm means within alarm box 10 if the secondary ignition system key is removed from the secondary ignition. The alarm may be halted by reinserting the secondary ignition key into the secondary ignition system. Alternatively, the alarm may be halted by shutting the engine off with normal engine key.

In yet another aspect of the truck security system of the present invention, the logic circuitry in control module 12 prevents the alarm system from being bypassed by an additional key, while the secondary ignition key is in use to start the engine of truck T. For example, if cargo door 3 or 4 of truck T in FIG. 1 is open, and an attempt is made to start the engine of truck T with the secondary ignition key and the regular truck ignition key, ignition will be prevented and an alarm will sound in the cab until the open door is closed. Use of a second key to shut (or disarm) the alarm by means of entry/reset switch module 8 will not bypass the alarm condition, allow the engine to start or halt the audible alarm.

Control module 12 has a master reset circuit located on alarm 10 box, which is typically activated by a key-in-lock switch system, normally the same key used for the secondary ignition system. However, an entirely different key may be used.

In other situations, it may be preferable to eliminate the master reset switch entirely and have the master reset functions accessed, for example, via a rear or side key activated entry/reset switch module 8. Turning the key in the master reset module lock or, in other embodiments, entry/reset module 8 activates a two partition, self-test diagnostic software program contained within control module 12.

Figure 2:
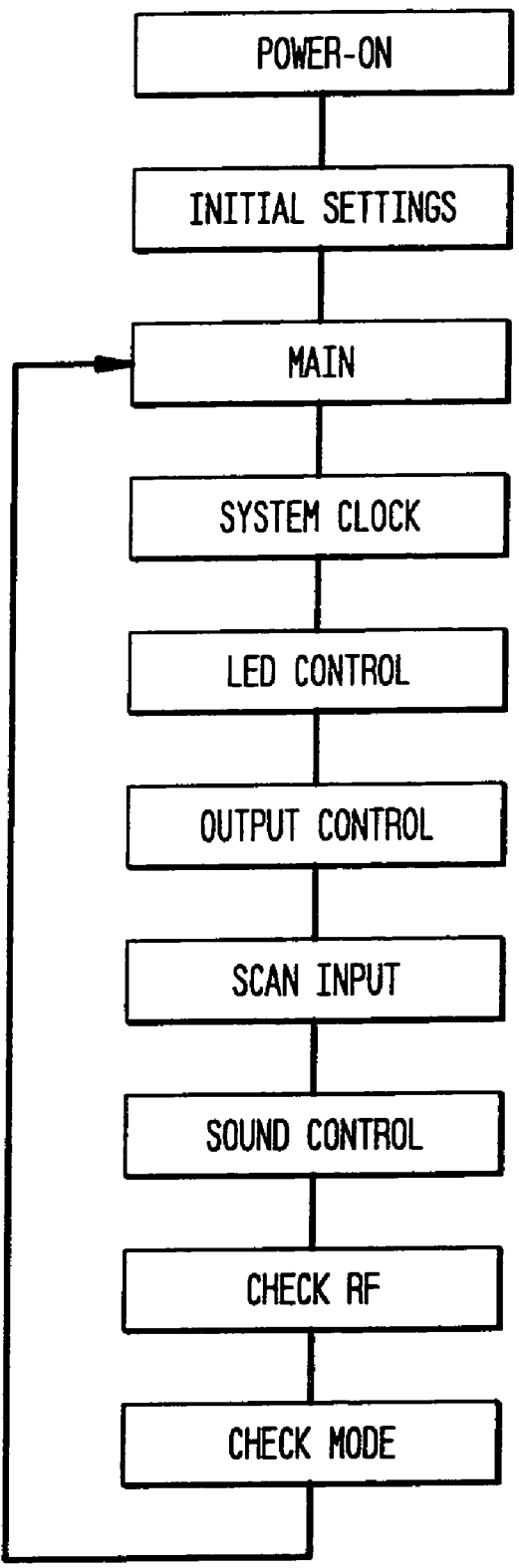
FIG. 2 is a flow diagram depicting the diagnostic check mode routine of the control module of the truck security system at power up.
Figure 3:
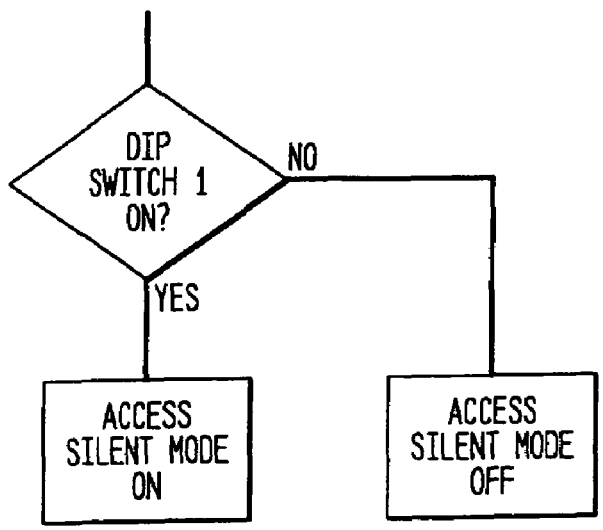
FIG. 3 is a flow diagram depicting the configuration of the alarm system controlled by DIP switch 1 of the main control module.
Figure 4:
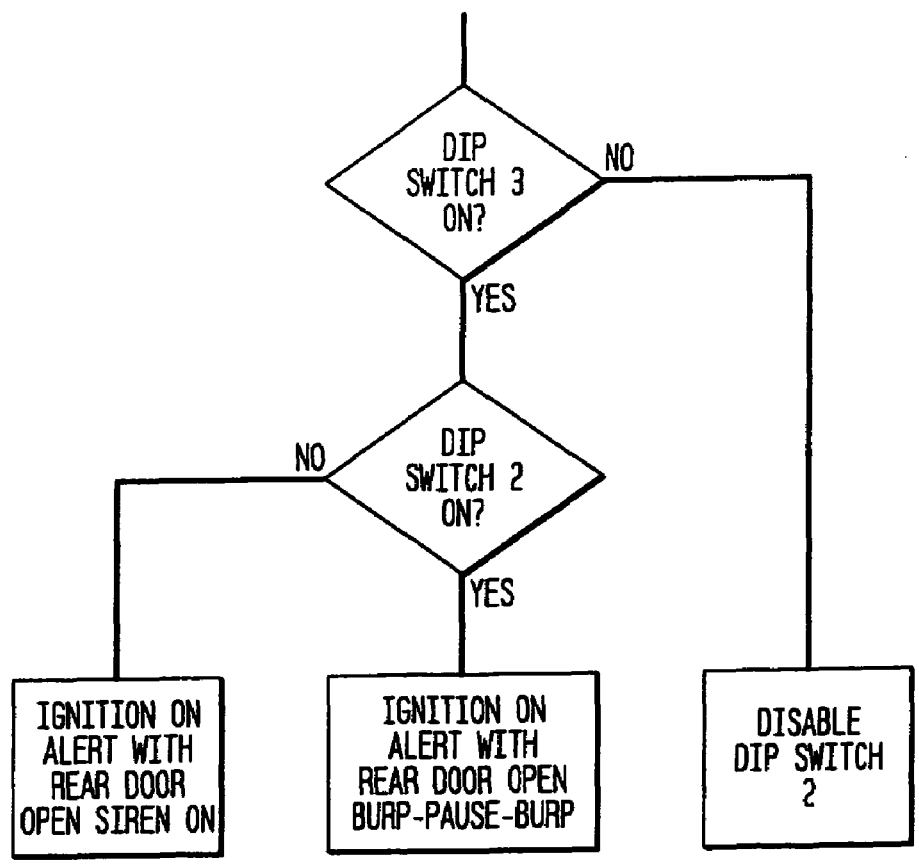
FIG. 4 is a flow diagram depicting the configuration of the alarm system controlled by DIP switch 3 of the main control module.
Figure 5:
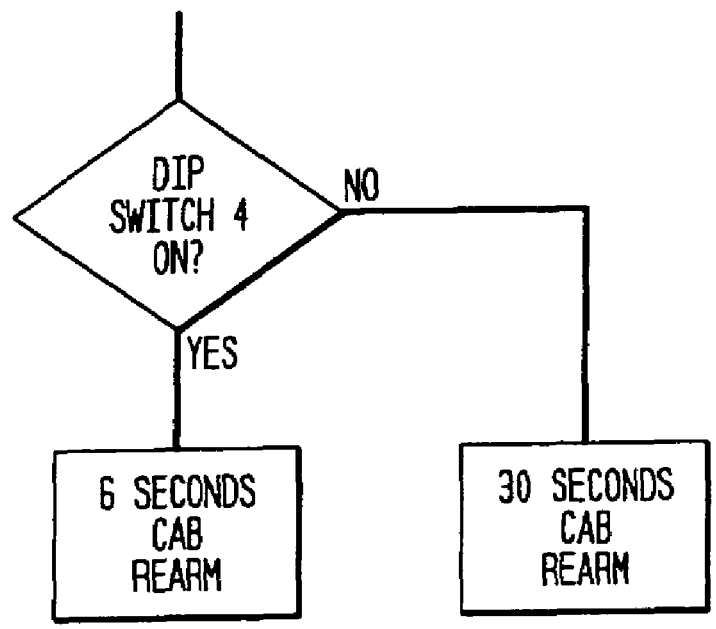
FIG. 5 is a flow diagram depicting the configuration of the alarm system controlled by DIP switch 4 of the main control module.
Figure 6:
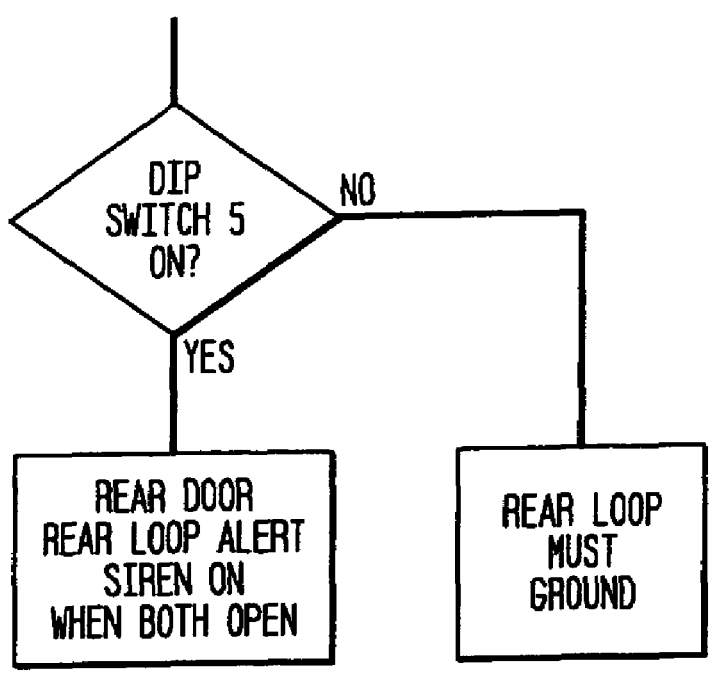
FIG. 6 is a flow diagram depicting the configuration of the alarm system controlled by DIP switch 5 of the main control module.
Figure 7:
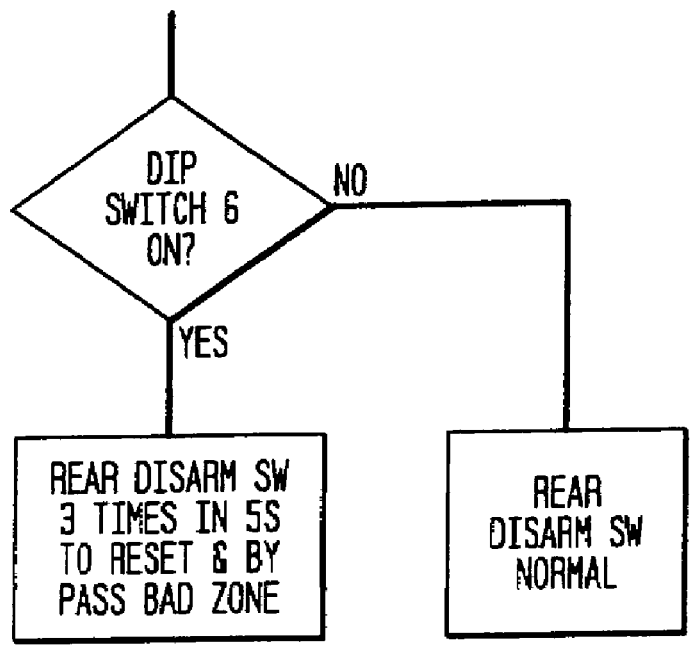
FIG. 7 is a flow diagram depicting the configuration of the alarm system controlled by DIP switch 6 of the main control module.
Figure 8:
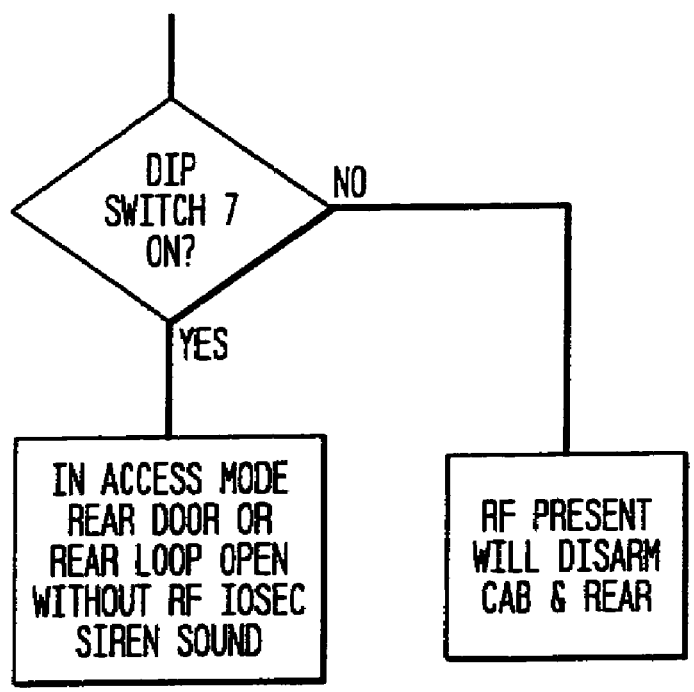
FIG. 8 is a flow diagram depicting the configuration of the alarm system controlled by DIP switch 7 of the main control module.

FIG. 2 is a flow chart illustrating an example of a self-test sequence that occurs as the system is powering up. Those skilled in the art will recognize that other sequences and procedures can be used. Using methods and hardware known in the art, the control module produces audible diagnostic sounds that are characteristic of specific malfunctions. Using methods known in the art, logic circuitry within control module 12 can be activated, typically by turning the key in the key in lock switch a fixed number of times within a specified interval, for example, 3 times in 5 seconds, to exclude a malfunctioning component that may cause a false alarm from the alarm system.

For example, a malfunctioning door sensor such as rear door sensor 13r or side door sensor 13s that erroneously signals a door open condition when the door is actually shut, and thus results in an alarm sounding when the engine is started, is temporarily excluded from the alarm system thereby avoiding the alarm. Thus, false alarms causing unnecessary disturbance during the course of delivery and pick-up can be avoided until the malfunction is repaired. When the alarm is turned off (or disarmed), for example, to allow access to cargo section S, a distinct audible signal, indicating that a malfunctioning zone has been bypassed, will be sounded. Once any excluded malfunctioning element of the alarm system is detected as having been repaired, it is automatically reincorporated into the system.

FIGS. 16A-16D together form a schematic diagram of the circuitry of main control module 12. The main control module 12 is programmable. The programmed functions of control module 12 are typically selected and controlled by a setting a number of DIP switches that are located on the circuit board or boards comprising the module. In the present invention, seven DIP switches are used to program the system. The DIP switches are depicted as switches S1 through S7 in the right hand portion of FIG. 16D. The eighth switch S8 depicted on that drawing is for expansion.

FIGS. 3 through 8 are flow charts of the program logic of control module 12 having the seven DIP switches controlling the program logic. FIGS. 17A and 17B together form an overview flow chart depicting the functions of the software in control module 12.

Figure 9:
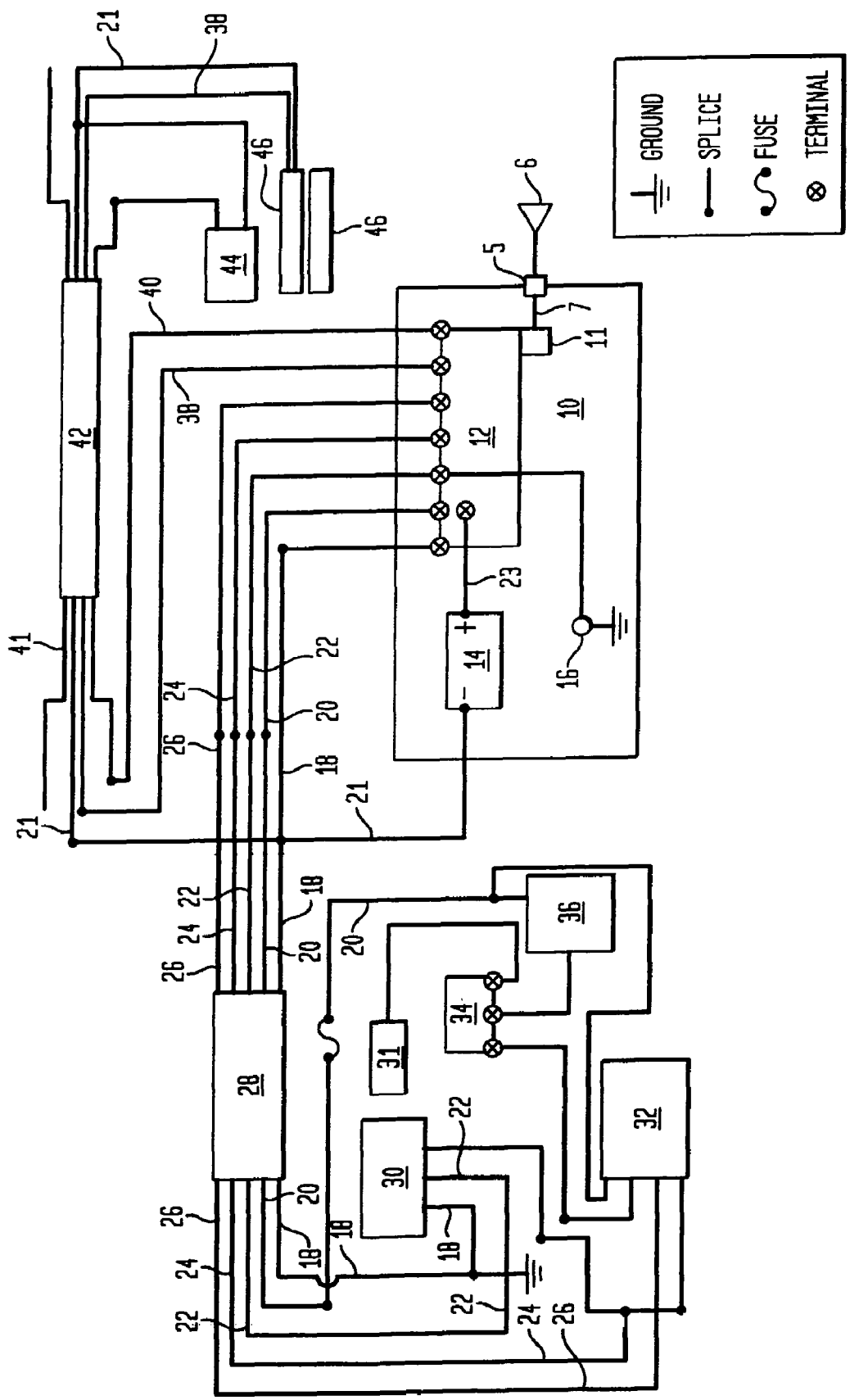
FIG. 9 is an overview schematic wire connection diagram showing wire connections from the front of a truck to an alarm box at the side of a truck and to the back of a truck.

FIG. 9 is an overview schematic wire connection diagram of a preferred embodiment of the truck security system of the present invention showing the wire connections from the front or cab of a truck to an alarm box 10 at the side of a truck and to the back of a truck. Alarm box 10 is a secure steel box that is either internally or externally secured to the side of a truck. It contains main control module 12, a battery power supply 14 and a grounded tamper pin switch 16. Electrical connections 18, 20, 22, 24 and 26 emerge from control module 12 and alarm box 10 typically in the form of a color coded multiwire cable 28, encased in a steel tube to prevent tampering, which runs to the cab of the truck and connects in the cab of the truck to security ignition box 30, module 32 containing audible alarming means, such as speaker means and siren means, ignition out relay 34 and truck ignition switch 36.

Electrical connections 38 and 40 emerge from control module 12 and alarm box 10, typically in the form of a color coded multiwire cable 42, also encased in a steel tube to prevent tampering, which runs to the back of the truck and connects to a master reset switch 44 and magnetic door sensor switches 46. Electrical connection 21 from the negative pole (−) of battery power supply 14 emerges from alarm box 10 and connects to electrical connection 18, to provide power to the security system components at the front of the truck, and to electrical connection 21, to provide power to the security system components at the back of the truck.

Electrical connection 23 connects from the positive pole (+) of battery power supply 14 within alarm box 10 to provide power to main control module 12, as indicated in FIG. 9. Cable 42 also contains at least one optional spare connection 41. RF signal receiver 11, located in alarm box 10, is connected via electrical connection 7, and antenna jack 5, to a RF antenna 6, located outside of alarm box 10. Antenna 6 receives the RF signals from the portable RF transmitter which are then conveyed to control module 12.

The electronic circuitry of RF signal receiving means 11 is depicted in the schematic diagram of FIG. 18. The method of processing an RF signal received from the RF transmitter by receiver 11 is depicted in a flow block diagram in FIG. 19.

Figure 10:
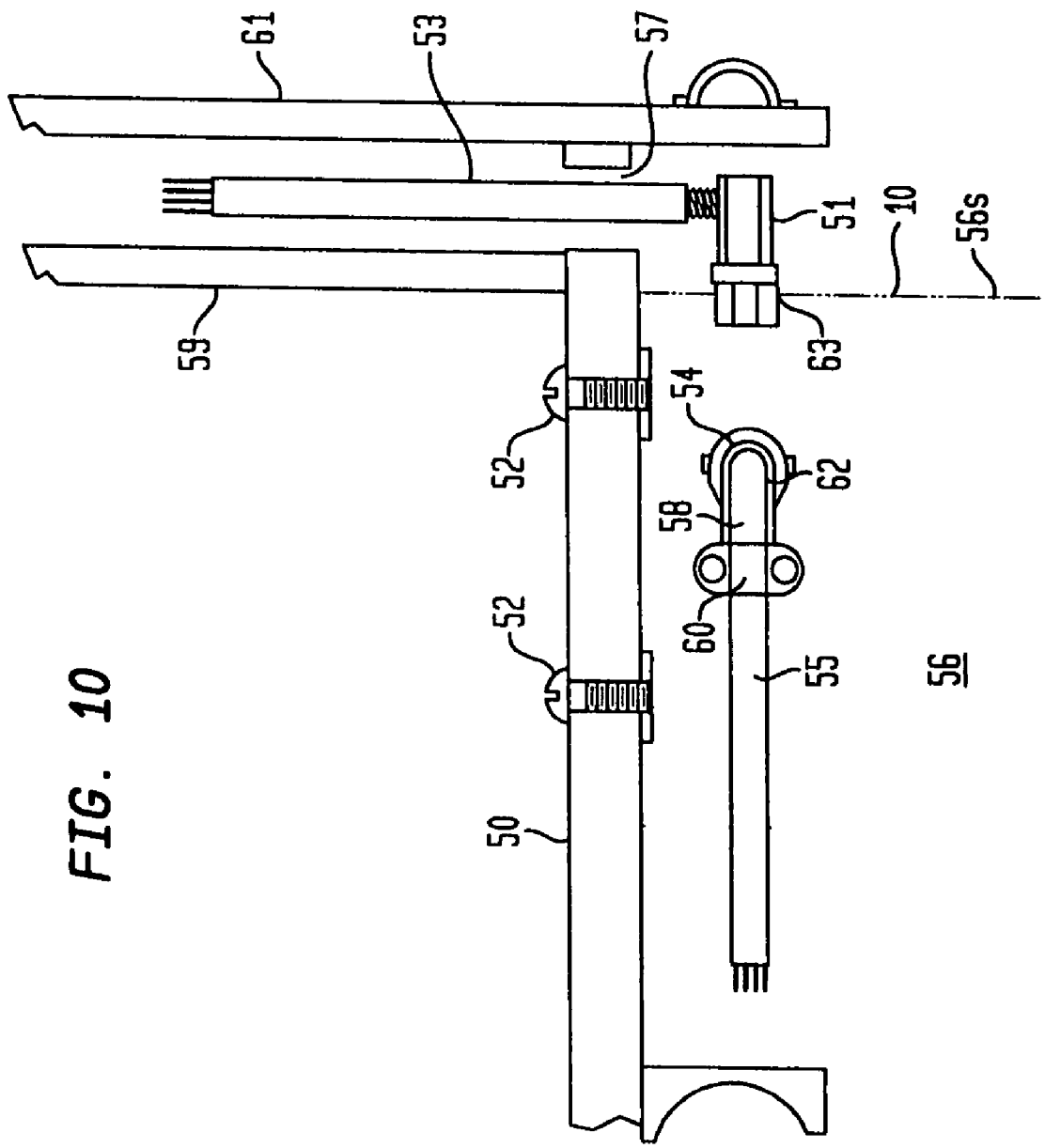
FIG. 10 depicts a typical physical mounting of the alarm box shown in FIG. 9 on a truck.

FIG. 10 is a side view of a typical physical mounting of an alarm box shown in FIG. 9. The alarm box 10 is securely mounted under truck floor 50 by mounting bolts 52. Typically, at least four mounting bolts are used. Electrical wire connections to the truck cab emerge from the box through an opening 54 in the alarm box wall 56 and into a pipe 55 securely connected and sealed to the wall 56, typically by means of a 90° pipe connector 58 and mounting hardware 60 and 62.

Pipe 55 contains cable 28, having electrical wire connections including 18, 20, 21, 22, 24 and 26 (see FIG. 9), is routed to the truck cab and hood. Cable 42, containing electrical connections 21, 38, 40 and spare 41, is routed to the rear of the truck via pipe 51 which comes through an opening 63 in the side wall 56s of alarm box 10 and connects to pipe 53, that typically runs between inner wall 59 and outer wall 61 of the truck, ultimately connecting to components of the security system at the rear and side of the truck. Variations and extensions of the wiring and installation schemes of FIGS. 9 and 10 required for trucks having more than one point of entry to the cargo area will be apparent to those skilled in the art.

While several preferred embodiments of the present invention have been disclosed for purposes of illustration, it is obvious that many modifications and variations could be made thereto. It is intended to cover all of those modifications and variations which fall within the scope of the present invention, as defined by the following claims.

I claim:

1. A security system for a truck having a cargo section and a door to access said cargo section, said door having an open and a closed condition, said security system comprising: control means situated on said truck; sensing means for detecting the condition of said door and for conveying to said control means a signal representative of the condition of said door; means situated on said truck for receiving RF signals and for conveying said received RF signals to said control means; alarm means situated on said truck; RF transmission means able to be carried by a person, said RF transmission means having a given RF output power corresponding to a distance within which said RF signal may be received by said RF signal receiving means; said RF transmission means continuously transmitting at regular intervals a digitized RF signal receivable by said RF signal receiving means; said control means comprising means to process said signal representative of the condition of said door, timing means to determine if said RF signal is received by said RF signal receiving means within an interval of time that is within a first time interval, and means for causing said alarm means to emit an audible alarm when said RF signal is not received within said first time interval, and the condition of said door is open.

2. The security system according to claim 1 wherein said RF output power of said RF transmission means is adjustable to change the maximum distance that said RF signal may be received by said RF signal receiving means.

3. The security system of claim 1 wherein said RF signal is continuously transmitted in groups of pulses with a given interval of time between said groups of pulses.

4. The security system according to claim 3 wherein said RF transmission means further comprises means. to change said given interval of time between said groups of pulses.

5. The security system of claim 1 wherein said RF signal comprises a multiplicity of digitized data sets.

6. The security system according to claim 1 wherein said RF transmission means further comprises means to transmit a distinct override RF signal receivable by said RF signal receiving means and wherein said control means further comprises means to reset said first time interval to a second time interval when said override RF signal is received so that an audible alarm is emitted when said second time interval is exceeded and the condition of said door is open.

7. The security system according to claim 6 wherein said second time interval is greater than said first time interval.

8. The security system according to claim 2 wherein said RF transmission means further comprises means to transmit at least two distinct override RF signals receivable by said RF signal receiving means and means to select and separately transmit one of said at least two distinct override RF signals, wherein each of said distinct override signals corresponds to a distinct increased time interval, wherein on receipt of any one of said distinct override signals by said RF signal receiving means, said control means resets said first time interval to an increased time interval corresponding to said received distinct override signal so that said alarm means emits an audible alarm when said interval of time exceeds said increased preset interval, thereby delaying the emission of an audible alarm when the condition of said door is open.

9. The security system according to claim 8 wherein said control means defaults to said first time interval in the absence of an override signal so that said alarm means emits an audible alarm when said interval of time exceeds said first time interval and the condition of said door is open.

10. The security system according to claim 8 wherein a one of said at least two distinct override signals is immediately transmitted with increased output range and the other of said distinct override signals is a steady state signal immediately transmitted with increased output range.

11. The security system according to claim 2 wherein said RF transmission means further comprises means to immediately transmit said pulsed signal with maximum output range.

12. The security system according to claim 2 wherein said RF transmission means further comprises means to immediately transmit a steady state signal receivable by said RF signal receiving means and wherein said control means further comprises means to increase said first time interval upon receipt of said steady state signal.

13. The security system according to claim 1 further comprising a plurality of said RF transmission means wherein each said RF transmission means transmits a distinct signal, wherein said control means further comprises means to recognize each of said distinct signals and wherein said alarm means emits an audible alarm when the condition of said door is open and no RF signal is received from any of said RF transmission means.

14. The security system according to claim 2 further comprising a plurality of portable RF transmission means wherein each said RF transmission means transmits a distinct signal and wherein said control means further comprises means to recognize each said distinct signal and wherein said alarm means emits an audible alarm when the condition of said door is open and no signal is received from any of said RF transmission means.

15. The security system according to claim 1 wherein, when said alarm means emits an audible alarm, and said RF signal is received by said RF signal receiver means in an interval of time corresponding to said first time interval, said control means silences said audible alarm when the condition of said door is open.

16. The security system according to claim 2 wherein, when said alarm means emits an audible alarm, and said RF signal is received by said RF signal receiver means in an interval of time corresponding to said first time interval, said control means silences said audible alarm, when the condition of said door is open.

17. The security system according to claim 1 wherein, when the condition of said door is open and said RF signal is received by said RF signal receiver means in an interval of time corresponding to said first preset interval, said control means does not convey a signal to said alarm means to emit an audible alarm.

18. The security system according to claim 2 wherein, when the condition of said door is open and said RF signal is received by said RF signal receiver means in an interval of time corresponding to said first time interval, said control means does not convey a signal to said alarm means to emit an audible alarm.

19. The security system according to claim 1 wherein said control means comprises logic circuitry.

20. The security system according to claim 2 wherein said control means comprises logic circuitry.

21. The security system according to claim 1 wherein said control means further comprises means to deactivate said alarm means within a defined period providing said RF signal is received by said RF signal receiver means in an interval of time corresponding to said first time interval, thereby allowing said door having a closed condition to be opened without causing said alarm means to emit an alarm.

22. The security system according to claim 21 wherein said control means further comprises means to automatically reactivate said alarm when said door having an open condition is closed.

23. The security system according to claim 22 wherein said control means comprises logic circuitry.

24. The security system according to claim 2 wherein said control means further comprises means to deactivate said alarm means within a defined period providing said RF signal is received by said RF signal receiver means in an interval of time corresponding to said first time interval, thereby allowing said door having a closed condition to be opened without causing said alarm means to emit an alarm.

25. The security system according to claim 24 wherein said control means further comprises means to reactivate said alarm means when said door having an open condition is closed.

26. The security system according to claim 25 wherein said control means comprises logic circuitry.

27. The security system according to claim 1 wherein said RF signal is digitized.

28. The security system according to claim 2 wherein said RF signal is digitized.

29. The security system of claim 1 wherein, when said receiving means are outside said distance, said receiving means does not receive said RF signal within a first preset interval.

30. A security system for a truck having a cargo section and a door to access said cargo section, said door having an open and a closed condition comprising: control means; sensing means to detect the condition of said cargo door and convey a signal representative of the condition of said door to control means; means for receiving RF signals and for conveying said received RF signals to said control means; alarm means situated on said truck; and RF transmission means able to be carried by a person, said RF transmission means having an RF output range corresponding to a distance, wherein said output range is continuously adjustable between minimum and maximum distance, and wherein said RF transmission means continuously transmits an RF signal in groups of pulses having a regular interval between said groups of pulses, said RF signal being receivable by said RF receiving means only when said RF signal receiving means is within said minimum and maximum distance of said RF transmission means, said control means further comprising means to process said RF signal according to the condition of said door, and timing means to determine if the interval of time between said groups of pulses in said RF signal is within a first preset value, wherein said alarm means emits an audible alarm when said interval of time exceeds said first preset value, and the condition of said door is open.

31. The security system of claim 30 wherein said RF signal is digitized.

32. The security system of claim 31 wherein said RF transmission means further comprises means to transmit an RF signal that is continuous.

33. The security system according to claim 30 wherein said RF transmission means further comprises means to transmit a distinct override signal receivable by said RF signal receiving means and wherein said control means further comprises means to increase said first preset value when said override signal is received by said RF signal receiving means, thereby halting any audible alarm until said interval of time exceeds said increased preset value.

34. The security system according to claim 30 wherein said RF transmission means further comprises means for transmitting at least two distinct override signals, each of said override signals corresponding to a distinct increased preset value, and means for selecting and separately transmitting one of said at least two distinct override RF signals, wherein, upon receipt of any one of said distinct override signals by said RF signal receiving means, said control means resets said first preset value to an increased value corresponding to an increased interval of time represented by said received distinct override signal so that said alarm means emits an audible alarm when said interval of time exceeds said increased value thereby delaying the emission of an audible alarm.

35. The security system according to claim 34 wherein said control means automatically defaults to said first preset value in the absence of an override signal so that said alarm means emits an audible alarm when said interval of time exceeds said first preset value.

36. The security system according to claim 34 wherein one of said at least two distinct override signals is a pulsed signal that is immediately transmitted with increased output range and a second one of said distinct override signals is a steady state signal that is immediately transmitted with increased output range.

37. The security system according to claim 30 wherein said RF transmission means further comprises means to immediately transmit said pulsed signal with maximum output range.

38. The security system according to claim 30 wherein said RF transmission means further comprises means to immediately transmit a steady state signal receivable by said RF signal receiving means and wherein said control means further comprises means to increase said first preset value upon receipt of said steady state signal.

39. The security system according to claim 30 further comprising a plurality of said RF transmission means wherein each said RF transmission means transmits a distinct signal, wherein said control means further comprises means to recognize each of said distinct signals and wherein said alarm means emits an audible alarm when the condition of said door is open and no signal is received from any of said RF transmission means.

40. The security system according to claim 30 wherein, when said alarm means is emitting an audible alarm, and said RF signal is received by said RF signal receiver means in an interval of time corresponding to said first preset value, said control means halts transmission of an alarm signal to said alarm means thereby silencing said audible alarm.

41. The security system according to claim 30 wherein, when the condition of said door is open and said RF signal is received by said RF signal receiver means in an interval of time corresponding to said first preset value, said control means does not convey a signal to said alarm means to emit an audible alarm.

42. The security system according to claim 30 wherein said control means comprises logic circuitry.

43. The security system according to claim 30 wherein said control means further comprises means to deactivate said alarm means within a defined period providing said RF signal is received by said RF signal receiver means in an interval of time corresponding to said first preset value, thereby allowing said door having a closed condition to be opened without causing said alarm means to emit an alarm.

44. The security system according to claim 43 wherein said control means further comprises means for automatically reactivating said alarm when said door having an open condition is closed.

45. The security system according to claim 44 wherein said control means comprises logic circuitry.

46. The security system according to claim 30 wherein said control means further comprises means to manually increase said first preset value.

47. A security system for a truck having a cargo section and a door to access said cargo section, said door having an open and a closed condition, a cabin, an engine and an ignition system to start said engine, said system comprising: control means; means for sensing the condition of said cargo door and for conveying a signal representative of the condition of said door to said control means; means for sensing the activation of said ignition system and for conveying a signal to said control means indicating that said ignition system is activated; ignition system disabling means; alarm means situated in said cabin, said control means comprising means for processing said representative signal received from said door condition sensing means, for causing said alarm means to emit an alarm, and for causing said ignition system disabling means to disable said ignition system, when said door is open and said ignition means is activated.

48. The security system according to claim 47 wherein said alarm is an audible alarm.

49. The security system according to claim 47 wherein, when the condition of said door is closed, said control means does not cause said alarm means to emit an alarm and does not cause said ignition system disabling means to disable said ignition system.

50. The security system according to claim 47 wherein said control means comprises logic circuitry.

51. The security system according to claim 49 wherein said control means comprises logic circuitry.

52. A security system for a truck having a cargo section, a rear door and a side door to access said cargo section, with each said door having an open and a closed condition, comprising; control means; means for sensing the condition of each of said rear door and said side doors and conveying signals representative of the condition of each of said rear door and said side doors to said control means; alarm means situated on said truck; said control means comprising means for processing said received signals from said sensing means and means for causing said alarm means to emit an alarm when both said rear door and said side doors are open.

53. The security system according to claim 52 wherein said alarm is an audible alarm.

54. The security system according to claim 52 wherein said control means comprises logic circuitry.

55. The security system according to claim 53 wherein said control means comprises logic circuitry.

56. Control apparatus for a truck security system, the truck being of the type having at least one cargo door, an engine and an engine ignition system, said control apparatus being situated on said truck and powered by means independent of the engine, said apparatus comprising: means for sensing whether each cargo door is open or closed and for generating a signal representative of the condition of each cargo door; alarm means; RF receiver means; means connected to said RF signal receiving means for measuring the interval of time between the receipt of successive RF signals by said RF signal receiving means and for generating a signal if said time interval exceeds a preset value, means for sensing the activation of said ignition system and for generating a signal representative thereof; control means for generating an alarm means energizing signal based on said signals generated by said cargo door sensor means, said RF signal receiving means, said timing means and said ignition system activation sensing means, and means for activating said alarm means in response to said alarm means activating signal; means for inactivating said engine ignition system in response to said alarm means activating signal; and means for enabling and disabling said means for generating an alarm means energizing signal.

57. The control device according to claim 56 further comprising means to alter said preset value, said means being activated by one or more distinct reset signals received by said RF signal receiving means.

58. The control device according to claim 56 further comprising means to alter said preset value, said means being activated by manual reset means.

59. The control device according to claim 56 wherein said control means comprises logic circuitry and said signals are digitized.

60. The control device according to claim 57 wherein said control means comprises logic circuitry and said signals are digitized.

61. The control device according to claim 58 wherein said control means comprises logic circuitry and said signals are digitized.

* * * * *